US009030966B2

(12) United States Patent
Lee et al.

(10) Patent No.: US 9,030,966 B2
(45) Date of Patent: *May 12, 2015

(54) METHOD AND APPARATUS FOR SESSION ROUTING IN HOME NETWORK SYSTEM

(71) Applicant: LG Electronics Inc., Seoul (KR)

(72) Inventors: Min Soo Lee, Seoul (KR); Jin Ho Kim, Seoul (KR); Beom Jin Jeon, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/059,121

(22) Filed: Oct. 21, 2013

(65) Prior Publication Data
US 2014/0044121 A1 Feb. 13, 2014

Related U.S. Application Data

(63) Continuation of application No. 13/033,183, filed on Feb. 23, 2011, now Pat. No. 8,593,996.

(60) Provisional application No. 61/306,963, filed on Feb. 23, 2010, provisional application No. 61/306,964, filed on Feb. 23, 2010, provisional application No. 61/327,730, filed on Apr. 26, 2010.

(51) Int. Cl.
H04L 12/16 (2006.01)
H04L 12/753 (2013.01)
(Continued)

(52) U.S. Cl.
CPC ........... *H04L 45/48* (2013.01); *H04L 29/06027* (2013.01); *H04L 45/56* (2013.01);
(Continued)

(58) Field of Classification Search
CPC . H04L 29/06027; H04L 45/56; H04L 45/306; H04L 45/00; H04L 45/021; H04L 45/123; H04L 45/48; H04L 12/2838; H04L 2012/2849; Y02B 70/325; Y04S 20/228
See application file for complete search history.

(56) References Cited

U.S. PATENT DOCUMENTS 4,710,917 A * 12/1987 Tompkins et al. ............ 709/204
6,215,763 B1 * 4/2001 Doshi et al. .................. 370/216
(Continued)

FOREIGN PATENT DOCUMENTS

EP           1445919 A2    8/2004
KR   10-2008-0070259 A    7/2008
(Continued)

*Primary Examiner* — Ajay Cattungal
(74) *Attorney, Agent, or Firm* — Birch, Stewart, Kolasch & Birch, LLP

(57) ABSTRACT

A method for supporting a session routing in a High Definition Base transmission (HDBaseT) network, the method including receiving, by an HDbaseT device from a Routing Processor Entity (RPE) through the HDBaseT network, a Link Status Request message requesting Link status information; configuring a Link Status Notify message for supporting the session routing, the Link Status Notify message including Link status information; and transmitting the Link Status Notify message to the RPE through the HDbaseT network. The Link status information of the Link Status Notify message is used to update a Link Status table, the Link Status table is used to compute routing path information from a source device to a sink device in the HDbaseT network, the HDbaseT device provides a simultaneous transmission of multiple streams, a transmission of uncompressed data, and a power transmission through a single link, and the multiple streams are transmitted uncompressed.

12 Claims, 22 Drawing Sheets

(51) Int. Cl.
*H04L 12/28* (2006.01)
*H04L 12/701* (2013.01)
*H04L 12/755* (2013.01)
*H04L 29/06* (2006.01)
*H04L 12/771* (2013.01)
*H04L 12/725* (2013.01)
*H04L 12/721* (2013.01)

(52) U.S. Cl.
CPC .......... *H04L 45/306* (2013.01); *H04L 12/2838* (2013.01); *H04L 45/00* (2013.01); *H04L 45/021* (2013.01); *H04L 45/123* (2013.01); *H04L 2012/2849* (2013.01); *Y02B 70/325* (2013.01); *Y04S 20/228* (2013.01)

(56) References Cited

U.S. PATENT DOCUMENTS

| | | | |
|---|---|---|---|
| 8,593,996 B2 * | 11/2013 | Lee et al. | 370/265 |
| 2003/0167307 A1 * | 9/2003 | Filepp et al. | 709/205 |
| 2003/0189930 A1 * | 10/2003 | Terrell et al. | 370/389 |
| 2004/0213274 A1 | 10/2004 | Fan et al. | |
| 2006/0039381 A1 * | 2/2006 | Anschutz et al. | 370/395.21 |
| 2006/0168328 A1 * | 7/2006 | Shimada et al. | 709/238 |
| 2008/0010379 A1 * | 1/2008 | Zhao | 709/226 |
| 2008/0216150 A1 * | 9/2008 | Brabson et al. | 726/1 |
| 2008/0279183 A1 | 11/2008 | Wiley et al. | |
| 2009/0015723 A1 * | 1/2009 | Doumuki | 348/725 |
| 2009/0089431 A1 * | 4/2009 | Kim et al. | 709/226 |
| 2010/0014528 A1 | 1/2010 | Amir et al. | |
| 2010/0118736 A1 | 5/2010 | Chung et al. | |
| 2010/0217882 A1 * | 8/2010 | Yang | 709/229 |
| 2010/0333150 A1 * | 12/2010 | Broerman et al. | 725/93 |

FOREIGN PATENT DOCUMENTS

| | | |
|---|---|---|
| KR | 10-2009-0037334 A | 4/2009 |
| KR | 10-2009-0090871 A | 8/2009 |

\* cited by examiner

FIG. 7
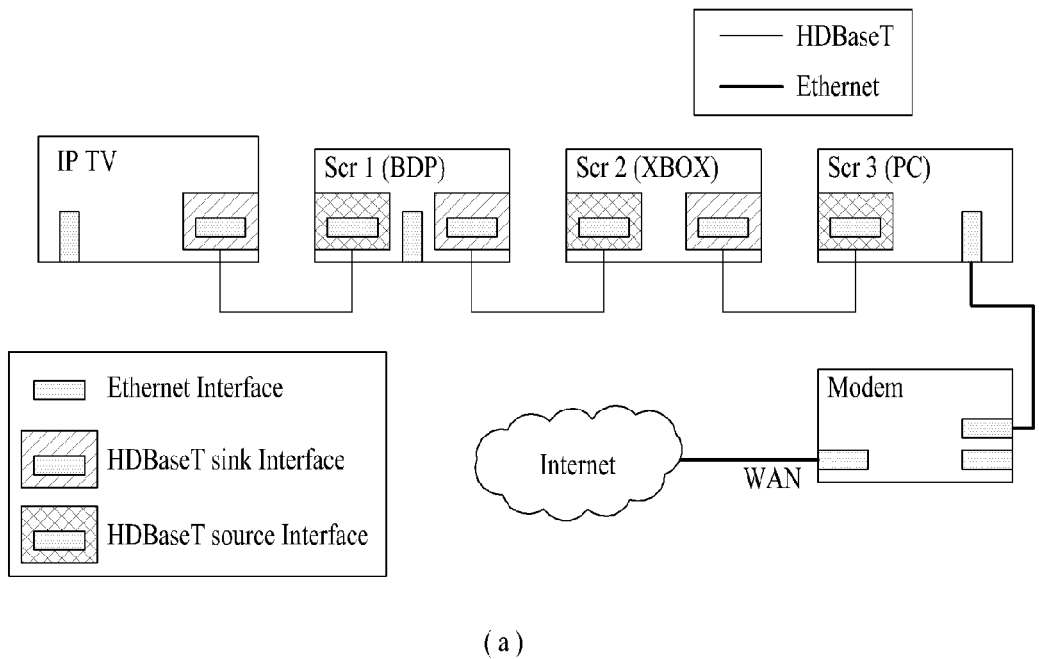
(a)
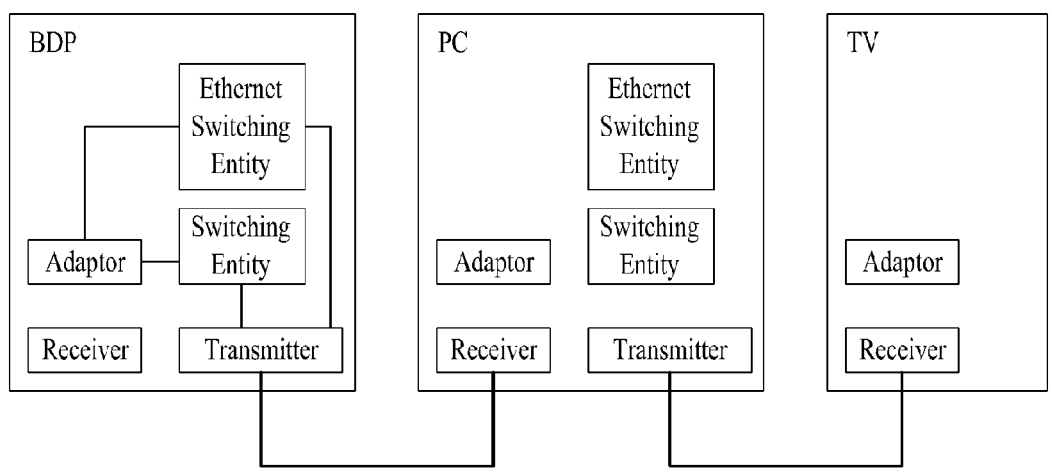
(b)

| Switch Routing Table | | | | |
|---|---|---|---|---|
| Source Node | Dest Node | Steram ID | Input Port ID | Output Port ID |
| NONE | NONE | NONE | 1 | NONE |
| NONE | NONE | NONE | 2 | NONE |

(b)

| Switch Routing Table | | | | |
|---|---|---|---|---|
| Source Node | Dest Node | Steram ID | Input Port ID | Output Port ID |
| 1 | - | 1 | 1 | - |
| 2 | - | 1 | 2 | - |

(c)

| Switch Routing Table | | | | |
|---|---|---|---|---|
| Source Node | Dest Node | Steram ID | Input Port ID | Output Port ID |
| 1 | 4 | 1 | 1 | 4 |
| 2 | 3 | 2 | 2 | 3 |

(d)

| Device Connection Table | | | |
|---|---|---|---|
| Source ID | Source Name | Sink ID | Sink Name |
| 1 | BDP | NONE | NONE |
| 2 | XBOX | NONE | NONE |

(e)

| Device Connection Table | | | |
|---|---|---|---|
| Source ID | Source Name | Sink ID | Sink Name |
| 1 | BDP | 4 | TV |
| 2 | XBOX | 3 | Monitor |

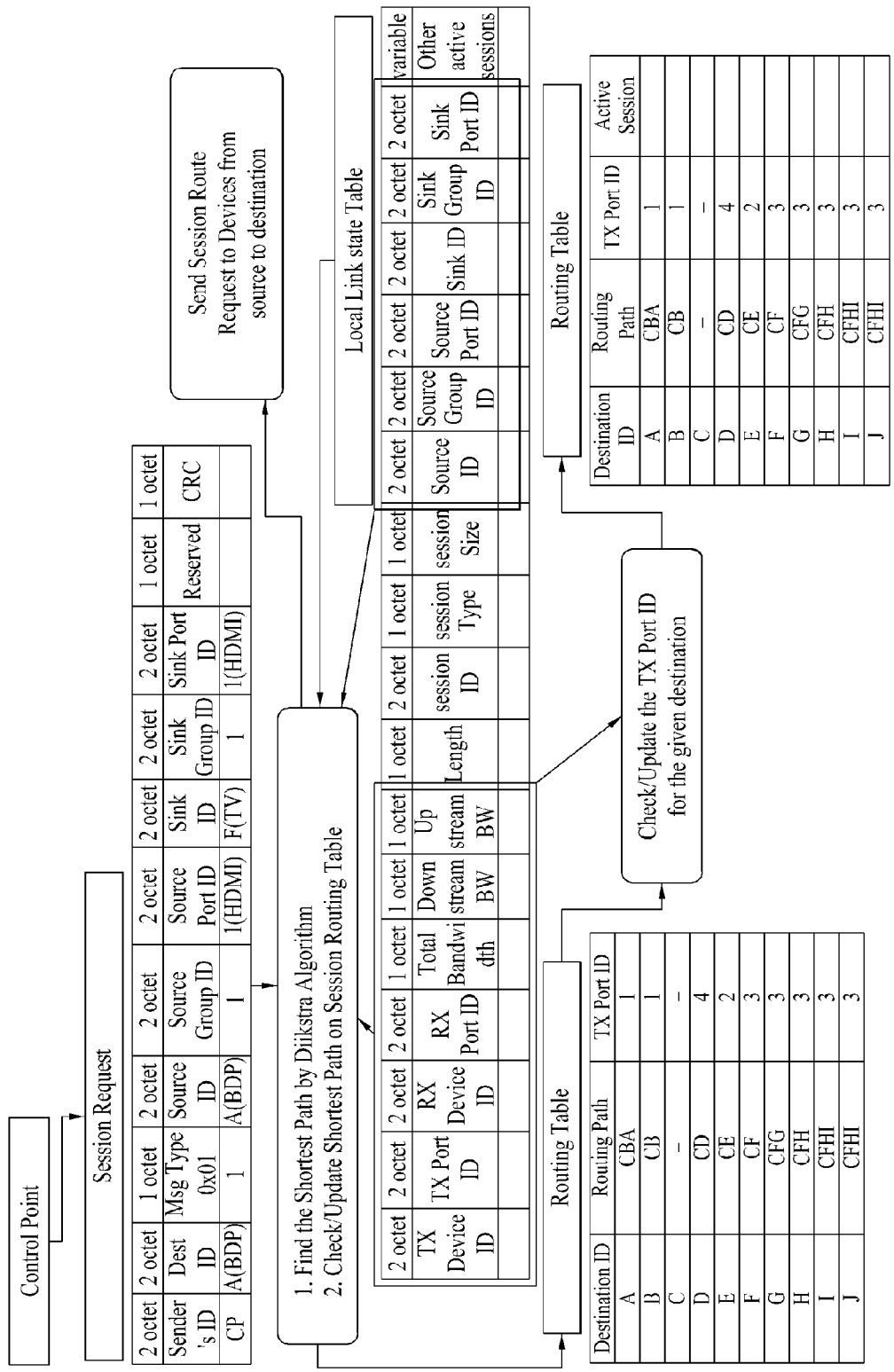

METHOD AND APPARATUS FOR SESSION ROUTING IN HOME NETWORK SYSTEM

This application is a Continuation of copending application Ser. No. 13/033,183 filed on Feb. 23, 2011, which claims the benefit of the Provisional U.S. Patent Application Nos. 61/306,963, filed on Feb. 23, 2010, 61/306,964, filed on Feb. 23, 2010, and 61/327,730, filed on Apr. 26, 2010, the entire contents all of which are hereby incorporated by reference as if fully set forth herein.

BACKGROUND OF THE INVENTION

1. Field of the Invention

The present invention relates to a home network system and, more particularly, to methods for configuring sessions in a home network system and setting up optimized paths of the configured sessions and apparatuses for supporting the same.

2. Discussion of the Related Art

The present invention relates to an HDBaseT (High Definition Base T) technology. An extensive number of cables are required for using television receivers (TVs), personal computers (PCs), and audio systems that are presently most frequently used in households and offices.

Among the HD (High Definition) transmission cable technologies that are presently most widely used, some of the technologies are limited in the transmission rate and also limited in the transmission capacity. Therefore, such limitation leads to a problem of not being capable of processing contents at a fast rate, wherein the size of the contents is constantly increasing. Also, since the current HD transmission technology does not support uncompressed video, it is difficult to connect multiple video devices to one another in case the devices are spaced apart from one another at a distance of a few meters. Furthermore, it is also difficult to provide HD multimedia integrated contents throughout the entire household and/or office.

Additionally, since HD TV cables, audio cables, video cables, Internet LAN cable, power supply cables, and so on are separately provided for each of the conventional electrical devices, there lies a problem in that the wiring (or lining) is complicated and does not provide a pleasant appearance.

Among the cables that are currently used, the HDMI (High Definition Multimedia Interface) cable is most widely used. Since the HDMI cable uses an uncompressed transmission method, the equipment of a decoder or a decoding software, which corresponds to the compression domain (or area), is not required. Furthermore, in case of using the HDMI technology, since signals, such as video signals, audio signals, and/or control signals, may be transmitted through a single cable by using a format integrated to a single digital interface, the HDMI technology is advantageous in that the complex wiring [or lining] for connecting the conventional AV (Audio/Video) devices can be simplified.

However, the HDMI technology is disadvantageous in that only uni-directional (or one-way) services from a multimedia source device to a display device are available, and that only a maximum cable length of 15 meters can be supported. Furthermore, when using the HDMI technology, it is difficult to efficiently support an environment where a plurality of multimedia sources is supported simultaneously. For example, since the HDMI technology is incapable of supporting USB, networking, a Daisy Chain method of a serial connection method, and so on, there are limitations in the adoption (or usage) of the HDMI technology.

SUMMARY OF THE INVENTION

Accordingly, the present invention is directed to methods for configuring sessions in a home network system and setting up optimized paths of the configured sessions and apparatuses for supporting the same that substantially obviate one or more problems due to limitations and disadvantages of the related art.

The HDBaseT technology that is disclosed in the present invention relates to providing the transmission of uncompressed high definition (or high picture quality) video and audio via an Ethernet of 100 Mbps and a CAT5/6 (Category 5/6) cable based 100 MBPS Ethernet through a single cable.

Additionally, the HDBaseT technology may also be used in home theaters, DVRs (Digital Video Recorders), BlueRay Players, gaming devices, PCs (Personal Computers), and/or mobile products, and the HDBaseT technology may be connected to multiple displays so as to configure a multi screen.

Furthermore, the HDBaseT technology may also provide bi-directional (or two-way) communication, transmission of multiple streams, and power transmission through a single cable.

In order to perform communication between HDBaseT devices, e.g., HDBaseT Adaptors (hereinafter referred to as T-Adaptors), within the above-described HDBaseT Network, it is imperative to configure a Session. A Session defines a communication network path and pre-decides the adequate services that are to be included in the defined communication network path. However, in the currently disclosed technologies, a method for setting up an optimized path of a session configured in the HDBaseT network has not yet been disclosed.

Therefore, an object of the present invention is to provide an efficient communication method used in a home network system and an apparatus for supporting the same.

Another object of the present invention is to provide a method for searching an optimal routing path in a session configured in an HDBaseT Network.

Another object of the present invention is to provide a method for notifying the state of a session within the HDBaseT Network.

A further object of the present invention is to provide a method for managing a session within the HDBaseT Network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a method for computing a routing path in an HDBaseT network, the method comprises transmitting a Link Status Request message data requesting Link information from a first device to a second device, receiving a Link Status Notify message including Link information of the second device from the second device, updating a Link Status table based upon the Link information of the second device, computing Routing Path information from a source device to a sink device based upon the Link Status table, and computing information on a transmission port being used in the routing path based upon the Routing Path information.

The Link Status Request message may include a source reference (RSR) field identifying the first device, and a final target reference (FTR) field indicating a final destination of the Link Status Request message. And, the Link Status Request message may further include a Link Status Request Type field indicating a type of the Link Status Request, and a device identifier field.

The Link Status Notify message may include a source reference (RSR) field identifying the second device, and a final target reference (FTR) field indicating a final destination of the Link Status Notify message. And, the Link Status Notify message may further include a downstream bandwidth field including information on a bandwidth of an available downlink stream and an upstream bandwidth field including information on a bandwidth of an available uplink stream.

The Link Status table includes a transmission identifier field configured to identify the first device, a transmission port identifier field configured to identify a transmission port of the first device, a reception device identifier field configured to identify the second device, a total bandwidth field configured to indicate a maximum bandwidth of a link, a downstream bandwidth field configured to indicate an available bandwidth of a downstream link, an upstream bandwidth field configured to indicate an available bandwidth of an upstream link, and a session identifier field configured to indicate a session identifier of an active session associated with the first device.

The first device may include a routing processor entity (RPE), and the routing path information and information on the transmission port may be computed by the routing processor entity.

The first device may correspond to a switch, and the second device may correspond to one of a source node, a reception node, another switch, and a control point.

In another aspect of the present invention, in an HDBaseT device for computing a routing path in an HDBaseT network, the HDBaseT device includes a routing processor entity configured to compute the routing path, a transmission port used in the HDBaseT network, a transmitter, and a receiver. Herein, the HDBaseT device may be configured to transmit a Link Status Request message requesting Link information by using the transmitter, and to receive a Link Status Notify message including Link information by using the receiver. And, the routing processor entity may update a Link Status table based upon the Link information, computes routing path information from a source device to a sink device based upon the Link Status table, and computes information on the transmission port being used in the routing path based upon the routing path information.

The Link Status Request message may include a source reference (RSR) field identifying the first device, and a final target reference (FTR) field indicating a final destination of the Link Status Request message. And, the Link Status Request message may further include a Link Status Request Type field indicating a type of the Link Status Request, and a device identifier field.

The Link Status Notify message may include a source reference (RSR) field identifying an HDBaseT device having transmitted the Link Status Notify message, and a final target reference (FTR) field indicating a final destination of the Link Status Notify message. And, the Link Status Notify message may further include a downstream bandwidth field including information on a bandwidth of an available downlink stream and an upstream bandwidth field including information on a bandwidth of an available uplink stream.

The Link Status table includes a transmission identifier field configured to identify the HDBaseT device, a transmission port identifier field configured to identify the transmission port, a reception device identifier field configured to identify a neighboring HDBaseT device of the HDBaseT device, a total bandwidth field configured to indicate a maximum bandwidth of a link, a downstream bandwidth field configured to indicate an available bandwidth of a downstream link, an upstream bandwidth field configured to indicate an available bandwidth of an upstream link, and a session identifier field configured to indicate a session identifier of an active session associated with the HDBaseT device.

The HDBaseT device may correspond to a switch. Herein, the HDBaseT device may transmit and receive messages, data, and contents to and from other HDBaseT device, such as a source node, a sink node, other switches, and a control point.

The above-described embodiments of the present invention are merely a portion of the preferred embodiments of the present invention. And, it is to be understood that both the foregoing general description and the following detailed description of the present invention are exemplary and explanatory and are intended to provide further explanation of the invention as claimed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 illustrates a Daisy Chain method used in the embodiments of the present invention;

FIG. 11 illustrates an updating procedure for a routing table and a device connection table;

FIG. 22 illustrates a method for managing a routing table and a link status table in a routing processor entity (RPE) supporting session routing according to an embodiment of the present invention.

DETAILED DESCRIPTION OF THE INVENTION

Figure 1:
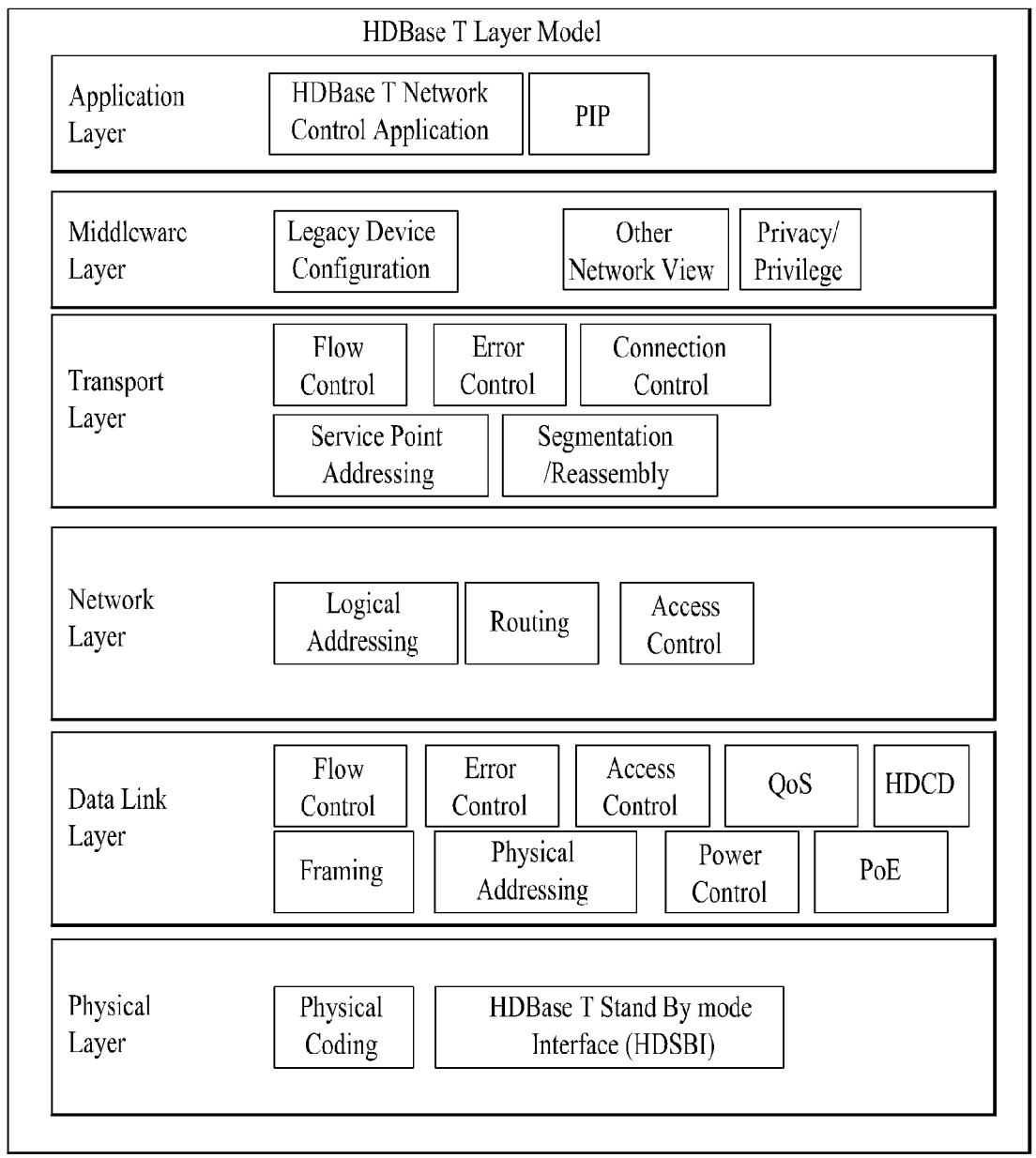
FIG. 1 illustrates an exemplary layer structure model of an HDBaseT network used in the embodiments of the present invention.

Reference will now be made in detail to the preferred embodiments of the present invention, examples of which are illustrated in the accompanying drawings. Wherever possible, the same reference numbers will be used throughout the drawings to refer to the same or like parts.

The embodiments of the present invention relates to a home network system, wherein methods for configuring a session within a home network and for setting up, managing, and notifying the configured session and apparatuses for supporting the same are disclosed.

The embodiments described below correspond to predetermined combinations of elements and features and characteristics of the present invention. Moreover, unless mentioned otherwise, each element or characteristic of the present invention may be considered as an optional feature of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In order to avoid any ambiguity in the concept (or idea) of the present invention, some of the structures and devices disclosed (or mentioned) in the present invention may be omitted from the description of the accompanying drawings of the present invention. Also, any procedure or step that can be easily understood by anyone skilled in the art has also been excluded from the description of the present invention.

In the specification of the present invention, the description of the embodiments of the present invention is focused mainly on data transmission and reception relation between a Source Device, a Sink Device, a Switch, and/or a Control Point.

According to the embodiments of the present invention, the term DS (Downlink Stream) refers to a logical data or stream flow being transmitted from a device providing contents to a device receiving the transmitted contents. Herein, the term Downlink Stream may be used as the synonym of the term Downlink. Additionally, the term US (Uplink Stream) refers to a logical data or stream flow transmitted in a direction opposite to that of the term Downlink Stream. Herein, the term Uplink Stream may be used as the synonym of the term Uplink.

Furthermore, a Source Device refers to a device providing contents, such as a Blu-Ray Disc Player (BDP), a DVR (Digital Video Recorder), a computer, an XBOX, a laptop computer, and so on. And, a Sink Device refers to diverse types of display devices that can realize the contents, such as a Home Theater system, a Television receiver, a monitor, and so on. The Sink Device may also be referred to as a data and/or contents destination or a destination entity.

Furthermore, the term end node refers to an entity positioned at the end of each transmitting and receiving ends within the HDBaseT Network.

The embodiments of the present invention may be supported by HDBaseT standard documents (most particularly, HDBaseT Specification Draft Version 1.0 and/or version 1.4). More specifically, reference may be made to the above-described documents for non-described steps or parts, among the embodiments of the present invention, that are apparent to those skilled in the art. Furthermore, all terms disclosed in the specification of the present invention may be described by the above-mentioned standard document.

Hereinafter, the preferred embodiments of the present invention will be described in detail with reference to the accompanying drawings. The detailed description of the present invention that is disclosed as follows with reference to the accompanying drawings is merely the description of exemplary embodiments of the present invention. And, therefore, the description of the present invention does not seek to represent a unique embodiment of the present invention.

The specific terms used in the following embodiments of the present invention are provided to facilitate the understanding of the present invention. And, therefore, without deviating from the technical scope and spirit of the present invention, such specific terms may also be varied and/or replaced by other terms.

I. HDBaseT Network

An object of the HDBaseT network is to provide a parallel network between real-time data streams, such as HDMI 1.4 streams, S/PDIF (Sony/Philips Digital Interconnect Format) streams, and USB (Universal Serial Bus) streams, and Ethernet data, user-premises configuration, and high-end networking.

Additionally, another object of the HDBaseT network is to provide a network that can support conventional devices/interface (i.e., legacy devices), such as HDMI, Ethernet, USB, and S/PDIF, and a network configured to support core network services that are to be developed in the future. (Herein, the S/PDIF corresponds to a standard for transmitting digital audio signals, and the S/PDIF originates from AES/EBU.)

HDBaseT Link operates to support four UTP (Un-shield Twisted Pair)/STP (Shielded Twist Pair) CAT5e/6/6a cables including two middle RJ45 connectors, 100 m and Peer-To-Peer (PTP).

A downlink stream sublink may support 8 Gbps, 500Msymboles/sec, PAM 16 symbols, and an upstream sublink may support 300 Mbps, 25Msymboles/sec, PAM 16 symbols. Furthermore, herein, bi-directional common usage (or shared) 200 Mbps between USB 1.0/2.0, S/PDIF, IR (Infra-Red), and UART (Universal Asynchronous Receiver/ Transmitter) is supported, and bi-directional Ethernet 100 Mbps is also supported.

HDBaseT may simultaneously support multi streams within a single link. Herein, the HDBaseT may support at least 8 HDMI 1.4 downlink streams, 12 USB or S/PDIF bi-directional streams, 8 IRs, and 8 UART bi-directional streams.

FIG. 1 illustrates an exemplary layer structure model of an HDBaseT network used in the embodiments of the present invention.

The HDBaseT network is based upon an OSI (Open System Interconnection) reference model. However, since the embodiments of the present invention are applied to the HDBaseT technology, FIG. 1 shows a new type of network layer structure, wherein the HDBaseT technology is combined with the OSI reference model.

Referring to FIG. 1, the HDBaseT network consists of a Physical Layer as the first layer (L1), a Data Link Layer as the second layer (L2), a Network Layer as the third layer, a Transport Layer as the fourth layer, a Middleware Layer as the fifth layer, and an Application Layer as the sixth layer.

At this point, the functions provided by the first layer include a Physical Coding function for transmitting a T-stream, a HDSBI (HDBaseT Stand By mode Interface) function, and so on.

The functions provided by the second layer include a Flow Control function, an Error Control function, an Access Control function, a QoS (Quality of Service) function, an HDCD (HDBaseT Configuration Database) function providing information on the configuration of an HDBaseT device, a Framing function, a Physical Addressing function, a Power Control function, a power controlling function via Ethernet (i.e., PoE (Power over Ethernet)) function.

The functions provided by the third layer include a Logical Addressing function, a Routing function for transmitting optimized data, an Access Control functions, and so on.

The functions provided by the fourth layer include a Flow Control function, an Error Control function, a Connection Control function, a Service Point Addressing function, a Segmentation/Reassembly function supporting the segmentation and assembly of upper level data, and so on.

The functions provided by the fifth layer include a Legacy Device Configuration function providing information on a legacy device for supporting the legacy device, a function for communicating with other networks (i.e., Other Network View function), a function for deciding privacy levels for protecting data and priority levels of data (i.e., Privacy/Privilege function), and so on.

The functions provided by the sixth layer include an HDBaseT Network Control Application function for controlling the communication through the HDBaseT network, and a function of showing (or displaying) a multi-streamed moving picture by using a PIP (Picture in Picture) method.

The HDBaseT devices used in the embodiment of the present invention may transmit and receive data and streams based upon the layer model structure of FIG. 1.

II. HDBaseT Adpator (T-Adaptor)

The HDBaseT Adaptor (hereinafter referred to as a T-Adaptor) converts diverse types of protocol/interface/application data formats to HDBaseT data formats, and vice versa. The T-Adaptor uses a T-network (a network used by the HDBaseT) for performing communication with other T-Adaptors, and a destination (or target) T-Adaptor may recover a converted HDBaseT system stream (hereinafter referred to as a T-stream) to the initial format.

Figure 2:
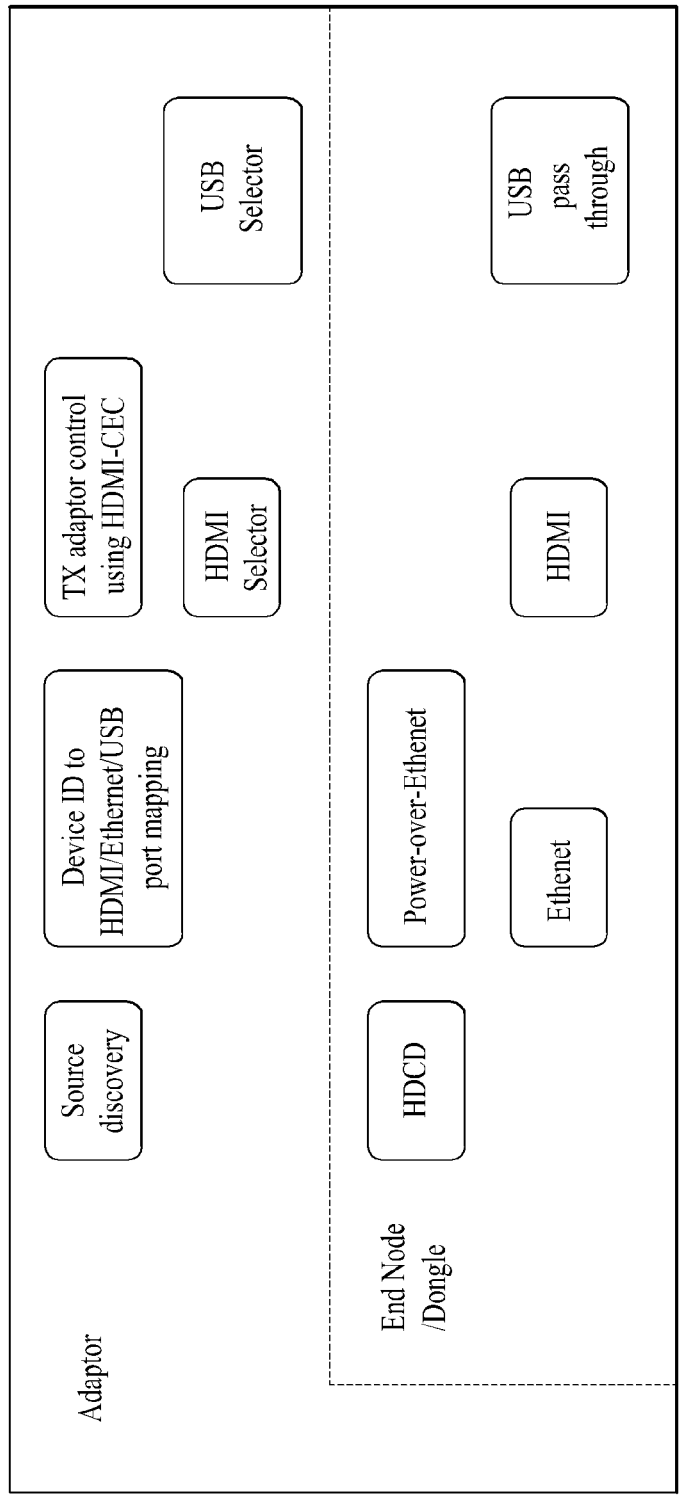
FIG. 2 illustrates the structure and functions of an HDBaseT adaptor used in the embodiments of the present invention.

FIG. 2 illustrates the structure and functions of an HDBaseT adaptor used in the embodiments of the present invention.

A T-Adaptor used in the HDBaseT system may include at least one of an end node (e.g., a Dongle), an HDMI selector, and a USB Selector.

Referring to FIG. 2, the T-Adaptor includes end nodes (e.g., Dongles), and the functions of the T-Adaptor includes a Source Discovery function, a device identifier mapping function (i.e., a Device ID to HDMI/Ethernet/USB ports mapping function), a Tx Adaptor control function using HDMI-CEC, an HDMI Selector, a USB Selector, and so on. Also, the end node included in the T-Adaptor may support an HDCD (HDBaseT Configuration Database), a Power over Ethernet function, an Ethernet port, an HDMI port, and a USB (1.0/2.0/4.0) port.

The T-Adaptor may include at least one or more HDMI input ports. The T-Adaptor may use an HDMI switching technique so as to connect HDMI data from a Source Device to Sink Device, which is connected to another T-Adaptor (i.e., an Rx Adaptor). At this point, the HDMI Selector may select one or more HDMI input ports based upon a control of an HDMI-CEC (Consumer Electronics Control) interface according to user settings. This will be referred to as HDMI selection.

Furthermore, the T-Adaptor may include one or more USB ports. Depending upon the user settings, the T-Adaptor may select one of the USB ports, and this process may be performed by the USB selector included in the T-Adaptor.

A single stream T-Adaptor supports a peer to peer connection with another adaptor within the HDBaseT network. By supporting the Legacy Network, such as Ethernet, USB, and CEC, the T-Adaptor may enable a CP (Control Point) to use the Legacy Network and may enable the HDMI switch to be controlled.

The main functions of the T-Adaptor that is used in the HDBaseT system include HDMI switching, a Source Discovery function for finding a source device connected to the HDMI port and/or USB port of the T-Adaptor, a Port Mapping function for selecting a USB port based upon the HDMI port selection, and so on.

The Source Discovery function refers to a function enabling the T-Adaptor to discover which source device is actually connected (or fixed) to the port included in the T-Adaptor itself. The T-Adaptor is unaware of the actual device name of the device that is connected to the HDMI port, Ethernet port, and USB port. The device name is directly (or personally) allocated (or assigned) by the user. In order to acquire and set up the actual device name from an HDCD (HDBaseT Configuration Database) device entity, the T-Adaptor may use HLIC (HDBaseT Link Internal Controls) acquisition/set up processing procedures (e.g., HLIC Get Transaction/HLIC Set Transaction) including a Device Description String.

The port mapping function refers to a function of mapping a Device Identifier to an HDMI port, an Ethernet port, and a USB port. Based upon the selection of a source device identifier, the T-Adaptor may select the corresponding HDMI/ Ethernet/USB ports as a port group. A USB Hub may be included in a reception T-Adaptor attached (or connected) to the USB port.

Figure 3:
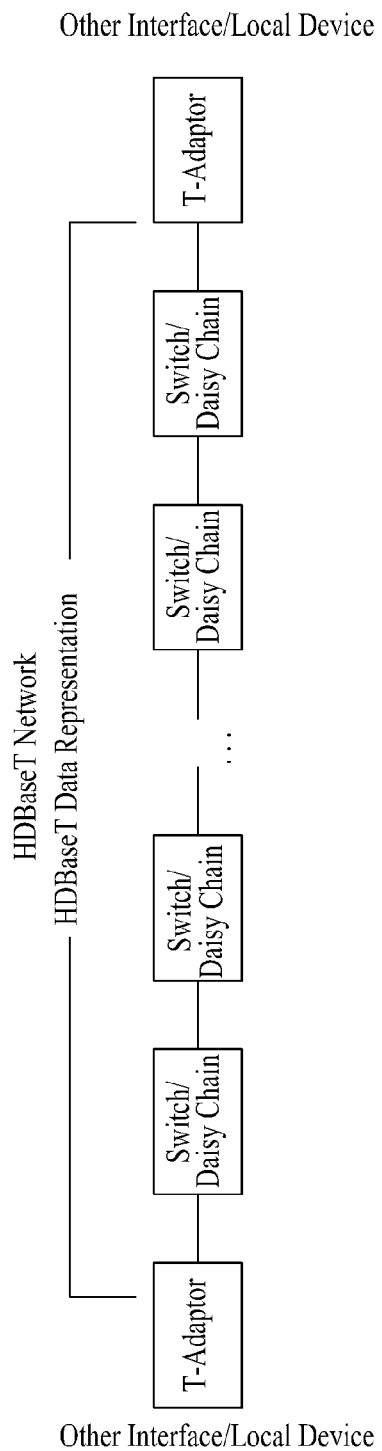
FIG. 3 illustrates an exemplary HDBaseT network (T network) used in the embodiments of the present invention.

FIG. 3 illustrates an exemplary HDBaseT network (T network) used in the embodiments of the present invention.

In order to support Ethernet services and real-time communication streams, the HDBaseT Network (hereinafter, T Network) may provide predictable and stable services with high efficiency and low delay. The T-Adaptor may provide adequate HDBaseT services through a Switch Device and through a connection group of Daisy Chain Devices, which support the serial connection method. For example, in accordance with the requirements of a native Protocol/Interface/Application, the T-Adaptor may select the adequate T-service through the Switch Device and the Daisy Chain Device. At this point, the Switch Devices and the Daisy Chain Devices are not required to be informed of the T-Adaptor type and the message processing method.

The T-Network corresponds to a region to which an HDBaseT stream that is converted from the T-Adaptor is transmitted. Herein, the T-Network refers to a communication region from the source T-Adaptor to a sink T-Adaptor. In a DS (Downlink Stream), the T-Adaptor is used as a transmission adaptor (Tx Adaptor), and in a US (Uplink Stream), the T-Adaptor is used as a reception adaptor (Rx Adaptor). At this point, the Tx Adaptor may be identically used as the Source Adaptor, and the Rx Adaptor may be identically used as the Sink Adaptor. More specifically, depending upon the transmission format of a stream, a T-Adaptor may perform the function of a Tx Adaptor and the function of an Rx Adaptor.

The HDBaseT-Stream (hereinafter, T-Stream) refers to a group of HDBaseT packet streams corresponding to information belonging to a native session. Each of the packets belonging to a T-Stream includes the same SID tokens. The T-Stream may optionally include different types of packets.

III. Method for Identifying an HDBaseT Entity

In the above description diverse HDBaseT devices and entities used in the HDBaseT Network have been described. However, a description as to how a T-stream is transmitted through multiple devices and entities and through multiple ports, when transmitting a T-Stream within the T-Network, has not been clearly made. Also, a description as to how the respective data or services are identified in accordance with the provided data and/or services, even when the data and/or services are transmitted to the same devices, has not yet been clearly made. Accordingly, hereinafter, a method for referring to and identifying HDBaseT entities within the HDBaseT Network will now be described in detail.

Figure 4:
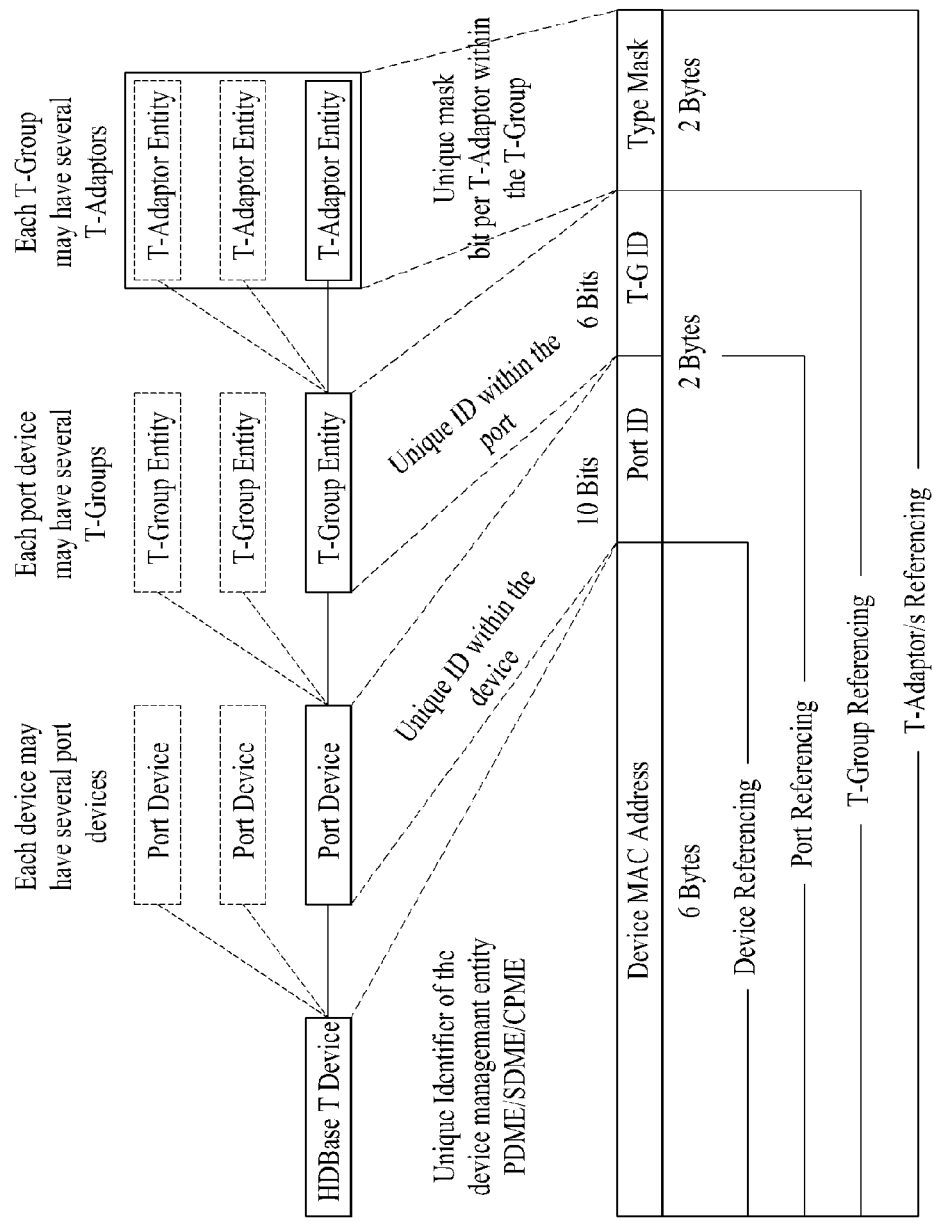
FIG. 4 illustrates a 4-level hierarchical reference method and an identifier structure, which are used for identifying HDBaseT entities as an embodiment of the present invention.

FIG. 4 illustrates a 4-level hierarchical reference method and an identifier structure, which are used for identifying HDBaseT entities as an embodiment of the present invention.

Referring to FIG. 4, one HDBaseT device may have one or more Port Devices. And, each Port Device may have one or more T-Groups (HDBaseT Group). Also, each T-Group may have one or more T-Adaptors. Hereinafter, a 4-level hierarchical reference method for identifying various entities within the HDBaseT Network will now be described in detail.

The 4-level hierarchical reference method may be performed by using a Device MAC Address for identifying control (or management) entities (i.e., Port Device Management Entity (PDME), Switch Device Management Entity (SDME), Control Point Management Entity (CPME)) that are included in an HDBaseT Device, a Port Identifier (Port ID) for identifying each port, a T-G Identifier (T-G ID) for identifying each T-Group, and a Type Mask being a unique mask for identifying each T-Adaptor.

In the embodiments of the present invention, a Device Identifier (Device ID) is used for identifying the HDBaseT Device. At this point, an Ethernet MAC Address may be used as the Device ID, and this may be referred to as the Device MAC Address. The Device MAC Address corresponds to a unique identifier for identifying management (or control) entities included in the corresponding HDBaseT Device.

It is preferable that the PDME (Port Device Management Entity), SDME (Switching Device Management Entity), and CPME (Control Point Management Entity) support Ethernet Termination. And, in case the PDME is used as the Ethernet Termination, the Ethernet MAC Address may be used as the unique identifier. However, in case the PDME is not used as the Ethernet Termination, it is preferable that the PDME uses an HLIC (HDBaseT Link Internal Controls) processing procedure so as to communicate with its link partner, the SDME. Also, by deducing (or deriving) the Device ID of the SDME, the PDME may borrow (or adopt) the identifier of the SDME. Furthermore, the PDME may use the SDME MAC Address as the Device ID of the PDME and may also use the Port Index of the SDME as the Port Index of the PDME. The Link Partner SDME shall deliver all control (or management) processing procedures to the PDME. If the link partner does not correspond to a switch of a direct point (i.e., peer to peer), the PDME cannot have a unique identifier.

Port Referencing (Device ID: Port ID) is required for uniquely identifying the PDME. In the embodiments of the present invention, by using the Ethernet MAC Address as the Device ID, a Linkage between the T-Network and an E-Network may be configured, and the management (or control) of the T-Network and sessions using Ethernet communication may this be performed.

Referring to FIG. 4, it is apparent that a Port Identifier (ID) field is used for identifying a Port Device, and that a T-G Identifier (ID) field is used for identifying a T-Group. At this point, the Port ID field and the T-Group field may be collectively used, both fields configuring a total size of 2 bytes (each field being configured of 10 bits and 6 bits). At this point, both the Port ID and the T-G ID may be referred to as a TPG Identifier (ID) (or a Group Port ID).

The 2 bytes of the TPG ID field may accompany a 10-bit index of the Port Device and 6-bit T-Group index within the Port Device. The Port Indexes ranging from 1 to 1023, each having a value other than 0, provide a unique reference for the Port Device within the HDBaseT Device. Also, the T-Group indexes ranging from 1 to 63, each having a value other than 0, provide a unique reference for a specific T-Group within the Port Device.

In the TPG ID, when the T-Group Index is equal to 0, the TPG ID provides a unique reference for a port within the HDBaseT and may be referred to as the Port ID. In case the Port ID is equal to 0, the TPG ID cannot provide any significant value.

Referring to FIG. 4, it can be known that a type mask field is used for identifying the T-Adaptor. Each T-Group may have one or more T-Adaptor type mask field indicating the T-Adaptor type associated to the corresponding group. The basic type mask field corresponds to a 16-bit sized field, and each bit indicates a specific type of a T-Adaptor associated with the corresponding T-Group.

Table 1 shown below indicates exemplary bit indexes of a type mask field corresponding to each T-Adaptor type.

TABLE 1

| Bit Index | T-Adaptor Type |
|---|---|
| 0 | HDMI Source |
| 1 | HDMI Sink |
| 2 | Reserved |
| 3 | Reserved |
| 4 | USB Host |
| 5 | USB Device/Hub |
| 6 | Reserved |
| 7 | Reserved |
| 8 | S/PDIF Source |
| 9 | S/PDIF Sink |
| 10 | Reserved |

TABLE 1-continued

| Bit Index | T-Adaptor Type |
|---|---|
| 11 | Reserved |
| 12 | IR Tx |
| 13 | IR Rx |
| 14 | UART |
| 15 | Extension Bit |

Referring to Table 1, Bit Indexes 0 and 1 respectively indicate an HDMI Source Device and a Sink Device. Bit Indexes 4 and 5 respectively indicate a USB Host and a USB Device/Hub. Bit Indexes 8 and 9 respectively indicate an S/PDIF Source and a Sink. Furthermore, Bit Indexes 12 and 13 respectively indicate an IR Transmission end (Infra-Red Tx) and an IR Reception end (Infra-Red Rx), and Bit Index 14 indicates a UART (Universal Asynchronous Receiver/Transmitter).

If Bit Index 15 (b15) is set up, this indicates that an additional extension field of 16 bits is additionally used in order to indicate the T-Adaptor type. Herein, the HDBaseT Device does not assume that Index 15 is always set to 0. Also, the HDBaseT Device may support up to 3 extension fields. For example, the HDBaseT Device may support a Type Mask field of up to 64 bits.

Each T-Group cannot be associated with multiple instances of a specific T-Adaptor type. Therefore, the Type Mask field may uniquely identify only the specific T-adaptor instance within the T-Group. Also, by using the type mask reference according to the present invention, one or a plurality of T-Adaptor instances may be referred to by the T-Adaptor group associated with the T-Group.

FIG. 4 discloses a hierarchical reference method for identifying a T-Adaptor by using 10 bytes. More specifically, when a T-stream is transmitted from a Source T-Adaptor to a Sink T-Adaptor, a message (or stream) including a 10-byte Source T-Adaptor identifier and a 10-byte Sink T-Adaptor identifier may be transmitted.

Furthermore, in case signals or messages are transmitted and received within a specific HDBaseT Device, adjustments may be made for each field. For example, an 8-byte Source identifier (e.g., a 6-byte Device Identifier+a 2-byte TPG Identifier) and an 8-byte Sink Identifier may be used in an HD-CMP message, which is used in a communication between a PDME of an HDBaseT end node and an SDME of an HDBaseT switch.

In the embodiments of the present invention, the Type Mask is used to differentiate the interface of the port. For example, in case an HDMI, an IR, and a USB are included in a T-Group Port Identifier, the Type Mask is used for distinguishing each interface. Also, the Type Mask may also be used in a case where a specific interface is designated within the T-Group Port Identifier when forming a session. For example, when a session is formed between two ports by using HD-CMP messages, the Type Mask may also be used when indicating the Source and Sink within the HD-CMP messages.

IV. Session

1. Session Routing

Figure 5:
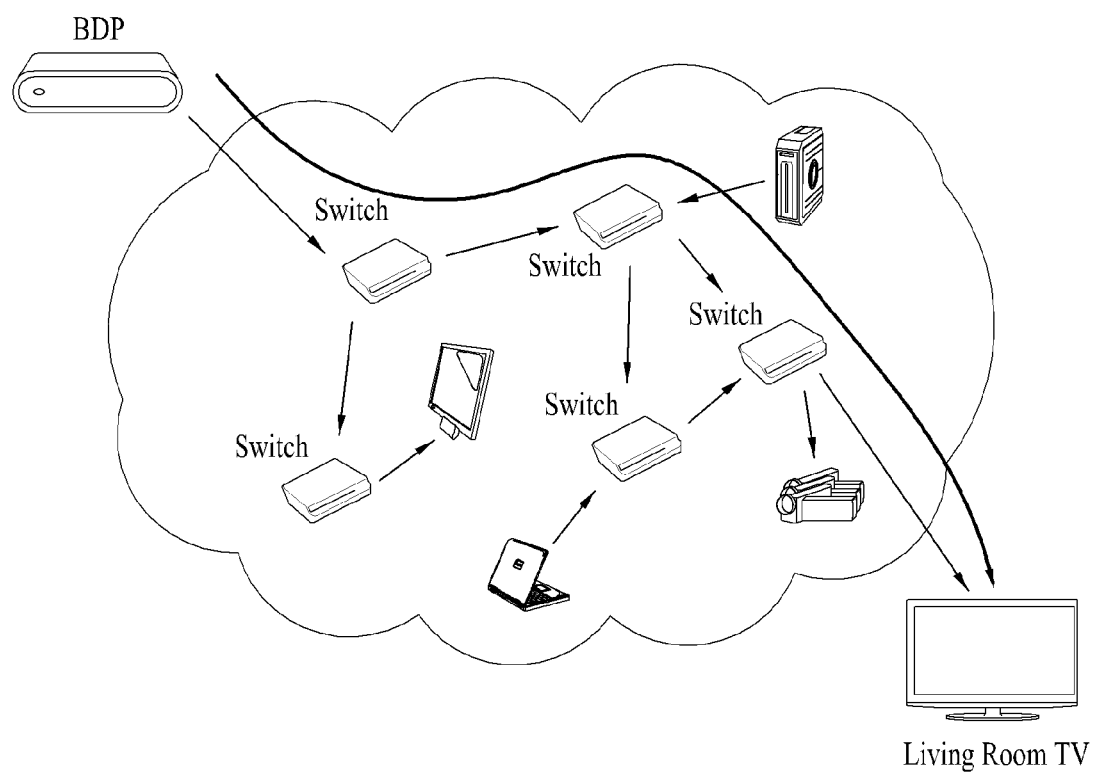
FIG. 5 illustrates an exemplary session routing according to an embodiment of the present invention.

FIG. 5 illustrates an exemplary session routing according to an embodiment of the present invention.

In order to communication with another T-Adaptor within the T-Network, Bit is imperative for the T-Adaptor to configure a session. A session defines a two-way communication and a path of a communication network, and pre-decides the adequate services included therein. According to the embodiments of the present invention, the term session may be used in combination with the term Link.

Each of the activated session is identified by an SID token (i.e., Session ID or Stream ID), which is accompanied in each HDBaseT Stream. HDBaseT Switches, which are included in the network path (hereinafter referred to as T-Switches) switch packets in accordance with the SID tokens.

The beginning or initiation of a session corresponds to configuring and establishing a communication network path of a session for exchanging HDBaseT data. Also, the Termination of a session refers to releasing (or deactivating) the communication network path for stopping (or terminating) the data exchange. According to the embodiments of the present invention, the methods for setting up reception and transmission paths of a data stream from a Source Device to a Sink Device may be referred to as Session Routing.

Referring to FIG. 5, the HDBaseT Network may include one or more Source Devices (e.g., BDP, XBOX, camcorder or computer, and so on), one or more Sink Devices (e.g., TV or monitor, and so on), and one or more switches.

At this point, session routing indicates setting up a path for transmitting Session Data from a BDP, which is a Source Device, to a TV set up in the living room, which is a Sink Device, among the many HDBaseT Links formed in the HDBaseT network.

HDBaseT paths supporting the Type 3 reference method may be configured in the HDBaseT Network. For example, the Type 1 reference method uses only a Device Identifier (Device ID or Ethernet MAC Address), the Type 2 Reference method uses a Device Identifier and a T-Group identifier, and the Type 3 Reference method uses the 4-layer reference method described in FIG. 4. In the embodiments of the present invention, each of the HDBaseT devices may adaptively use the Type 3 Reference method.

2. Switch

Figure 6:
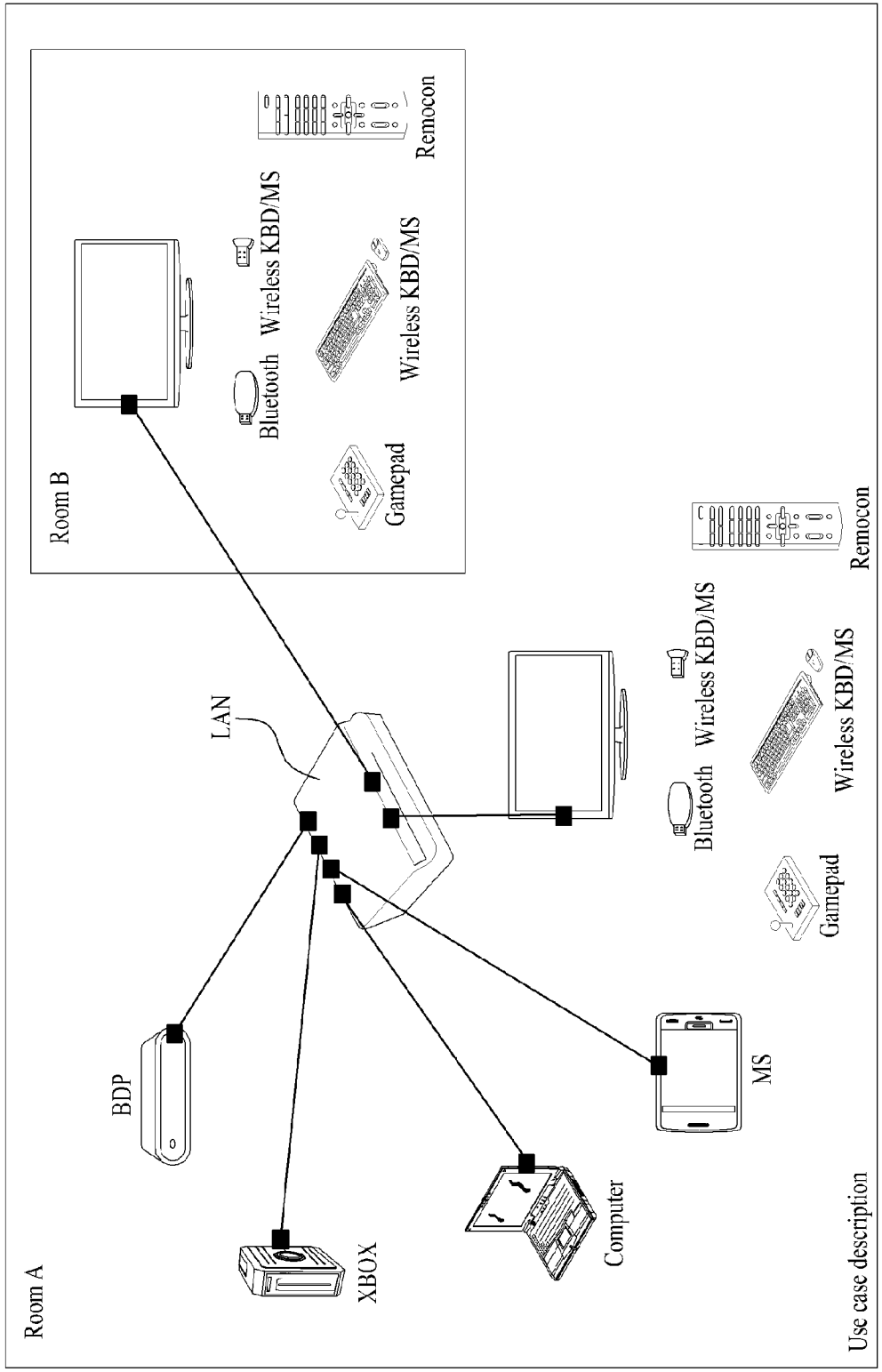
FIG. 6 illustrates one of the exemplary applications of a switch according to an embodiment of the present invention.

FIG. 6 illustrates one of the exemplary applications of a switch according to an embodiment of the present invention.

A switch corresponds to one of the HDBaseT devices required for performing session routing. The HDBaseT Network has been designed in order to connect multiple electrical appliances through a single network in a regular household. At this point, a switch may deliver session data (i.e., T-Streams) from one or more Source Devices to one or more Sink Devices.

Referring to FIG. 6, Session Data being transmitted from a Source Device (e.g., BDP, XBOX, computer, mobile station (MS), and so on) located in Room A may be delivered to a Display Device (e.g., TV) of Room B by passing through a switch.

FIG. 7 illustrates a Daisy Chain method used in the embodiments of the present invention.

Referring to FIG. 7(a), an IP TV (Internet Protocol TV), which is a Sink Device, may be serially connected to Source Devices BDP (Src 1), XBOX (Src 2), and PC (Src 3). This is referred to a s Daisy Chain method. At this point, an Ethernet interface and an HDBaseT Sink interface may be realized in the IP TV, and at least one or more of an Ethernet interface, HDBaseT Source Interface, and an HDBaseT Sink interface may be realized in the Source Devices.

In FIG. 7(a), the PC may be connected to the Internet through a modem. At this point, an Ethernet routing performance may be supported in order to access an interne service through a BDP and/or IP TV, which is/are connected to the HDBaseT Daisy Chain Link.

HDBaseT Uplink Stream (US) and/or Downlink Stream (DS) packets carrying an Ethernet payload may be identified by a packet type code included in the packet header field. The T-Adaptor included in the HDBaseT Device may depacketize all HDBaseT packets carrying an Ethernet payload. At this point, each HDBaseT Device decides an Ehternet packet transmission path based upon an Ethernet Routing Table.

In order to configure and update the Ethernet Routing Table, entities having an ELV structure may periodically use an HLIC (HDBaseT Link internal Controls) Get/Set Transaction between HDBaseT Daisy Chain devices.

FIG. 7(b) illustrates another exemplary Daisy Chain method. Referring to FIG. 7(b), it can be verified that a transmitter of the BDP and a receiver of the PC are connected to one another through an HDBaseT interface, and that the PC and the TV are connected to one another through an HDBaseT interface.

In FIG. 7(b), Source Devices (e.g., BDP and computer (PC), and so on) may include an Ethernet Switching Entity for switching Ethernet data, a T-Adaptor for converting HDBaseT streams and native data (e.g., HDMI data, USB data, or Ethernet data, and so on), and a Switching Entity for switching HDBaseT data depending upon the control of a control point.

Also, Source Devices may include a Receiver for receiving HDBaseT data and a Transmitter for transmitting HDBaseT data. At this point, the receiver may output HDBaseT session data and Ethernet session data, and the transmitter may receive HDBaseT session data and Ethernet session data.

In the embodiments of the present invention, the T-Adaptor may provide Power to legacy devices, and the transmitter may deliver power to the receiver, and the receiver may receive power from the transmitter.

Furthermore, Sink Devices (e.g., TV, and so on) may include a receiver for receiving data and a T-Adaptor.

Figure 8:
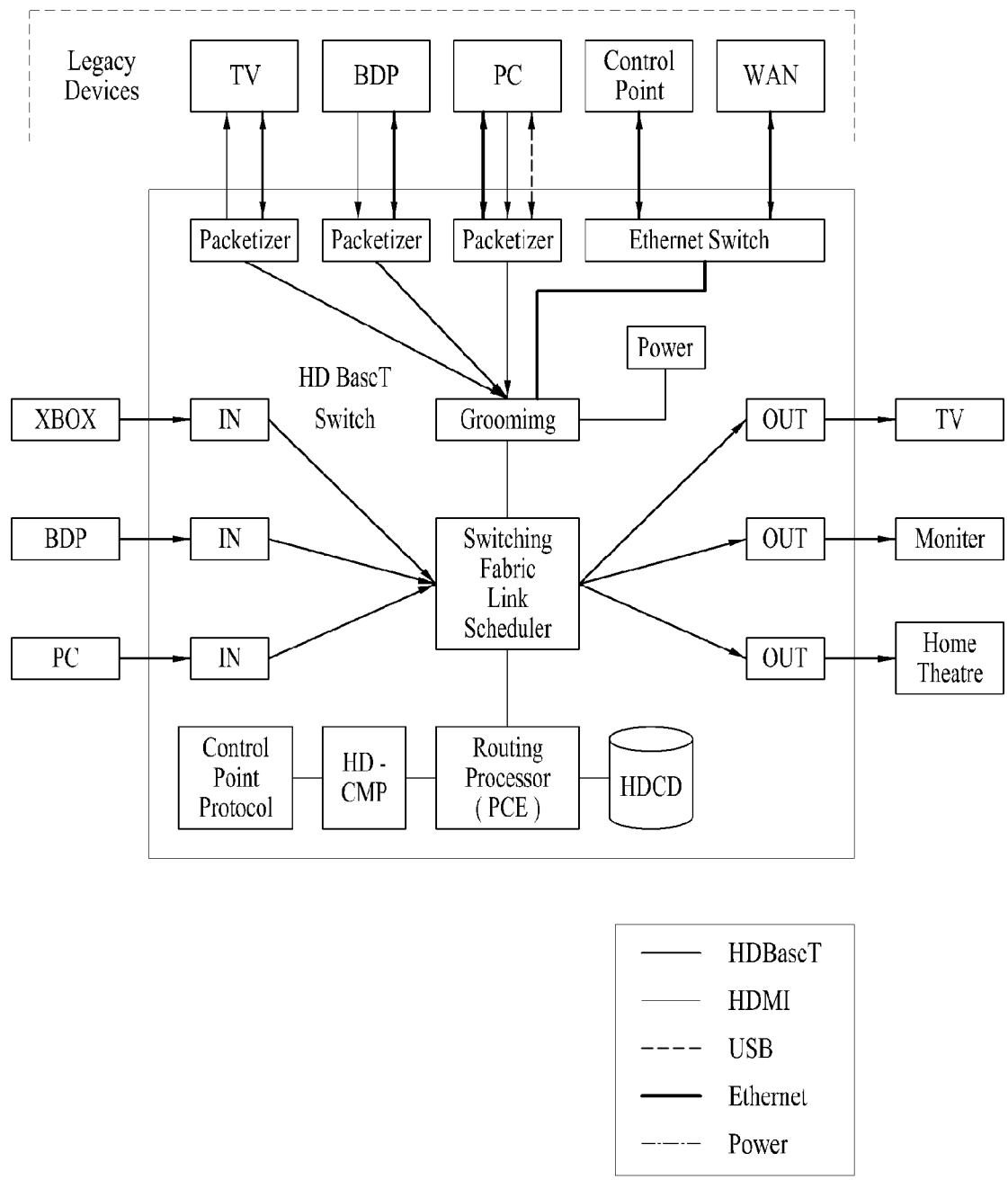
FIG. 8 illustrates an exemplary switch structure according to an embodiment of the present invention.

FIG. 8 illustrates an exemplary switch structure according to an embodiment of the present invention.

Multiple Stream HDBaseT Devices may support an HDBaseT Star within the HDBaseT network along with other Dongles, T-Adaptors, and switches. The switch may support legacy devices so that the CP (Control Point) can use legacy devices, such as Ethernet, USB, CEC, and so on. An, HDBaseT Switch (T-Switch) may have one or more HDBaseT Ports. The T-Switch may set up a data path for another Sink Device from a Source Device, and the T-Switch may deliver HDBaseT Data through the set up path. This is referred to as HDBaseT Switching. HDBaseT Switching may be controlled by an HDBaseT Control Point (CP), which is designated by an HDMI-CEC and/or the user.

Referring to FIG. 8, the Switch may include one or more Input Ports receiving an HDBaseT Stream, one or more Output Ports for transmitting the HDBaseT Stream, one or more packetizers for converting and recovering native data (e.g., HDMI data, USB data, Ethernet data, etc.) transmitted from the legacy devices to HDBaseT Streams, and Ethernet Swtiching Unit for switching Ethernet data, a Grooming Unit for categorizing different types of input signals (or data) by service types or destination and transmitting the categorized signals (or data), and a Switching Fabric Link Scheduler for switching HDBaseT Streams.

Furthermore, the Switch of FIG. 8 may further include a Control Point Protocol Entity managing control commands that are transmitted from the control points, an HD-CMP (HDBaseT Control and Management Protocol) Entity, and an HDCD (HDBaseT Configuration Database) Entity. At this point, the HD-CMP entity may support control point signaling for Device Discovery, Link Discovery, Video/Audio Route Discovery/Set-up/Release, and HDBaseT Switching control.

Figure 9:
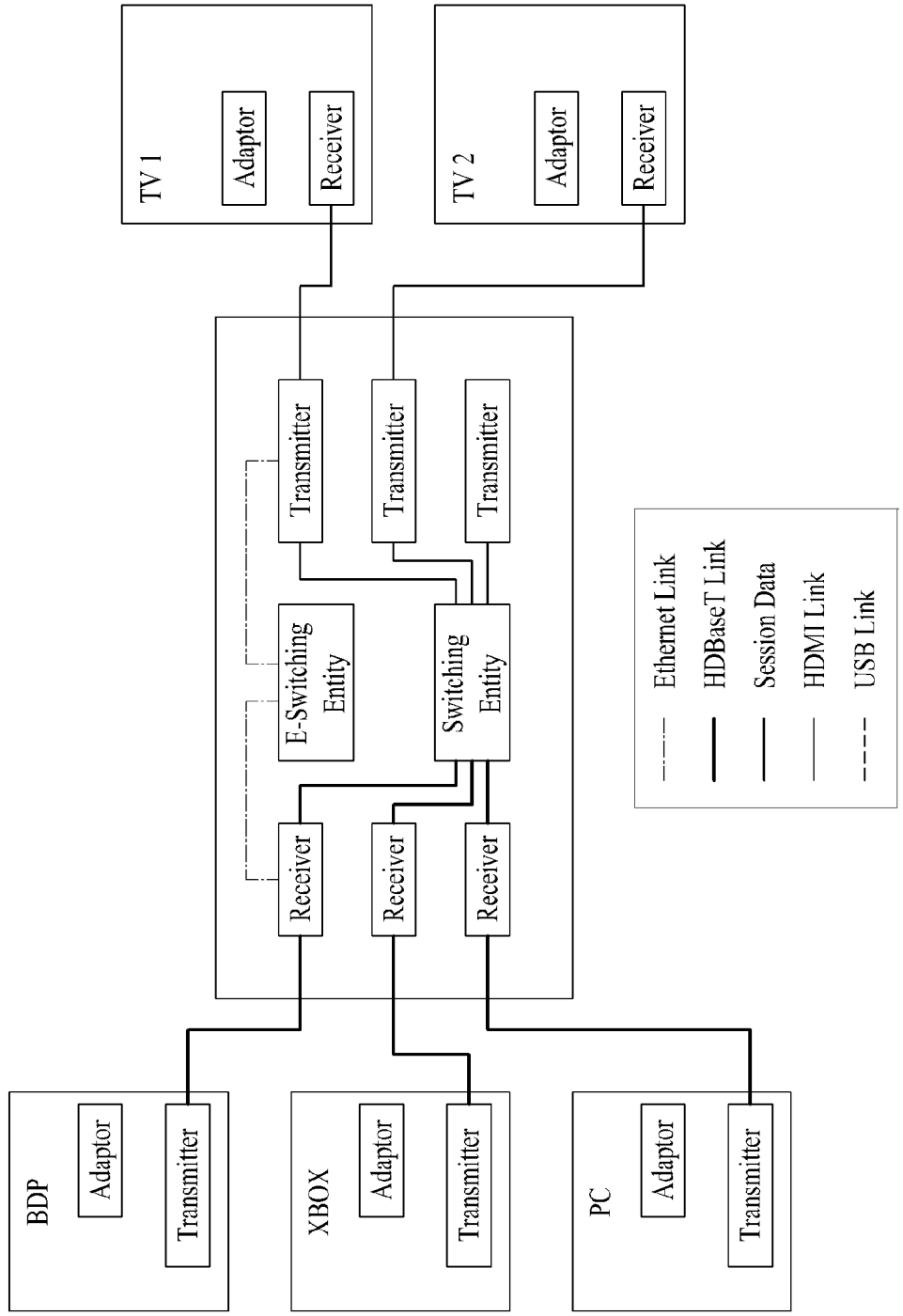
FIG. 9 illustrates another exemplary switch structure according to an embodiment of the present invention.

FIG. 9 illustrates another exemplary switch structure according to an embodiment of the present invention.

Referring to FIG. 9, the Switch may include an Ethernet Switching Entity, a Switching Entity, one or more Transmitter, and one or more Receivers. Also, BDP, XBOX, and PC, and so on, which correspond to Source Devices, may include a T-Adaptor and a transmitter, and TVs, and so on, which correspond to Sink Devices, may include a T-Adaptor and a receiver.

The T-Adaptor may convert native data, such as HDMI session data, USB session data, and Ethernet session data, to HDBaseT session data, or the T-Adaptor may convert HDBaseT session data to native data. Also, the T-Adaptor may provide power to the legacy devices.

The Switching Entity may receive HDBaseT session data, which include HDMI, USB, or Ethernet session data. Also, the Switching Entity may correspond to control messaged transmitted from the Control Points, and sessions may be adequately configured based upon the control messaged and channel status.

Also, the Switching Entity may perform the functions of Session Generating, Network Access Control HDBaseT Switching, USB Switching, Sink Discovery, Source Discovery, Session ID Manager, and Control Point Manager.

The Ethernet Switching Entity may switch Ethernet session data.

The HDBaseT devices disclosed in the present invention may provide Full HD Multimedia, Ethernet, and Control signals through a single cable at the same time. For example, the Source device may deliver uncompressed HD streaming to the Sink Device without any delay. Also, the user may control from a room a Source Device or Sink Device positioned in another room through the HDMI-CEC. Furthermore, by being capable of transmitting Full HD Contents to any display device within the user premises, handover may be performed quickly and easily on the contents.

3. Method for Performing Session Routing

Figure 10:
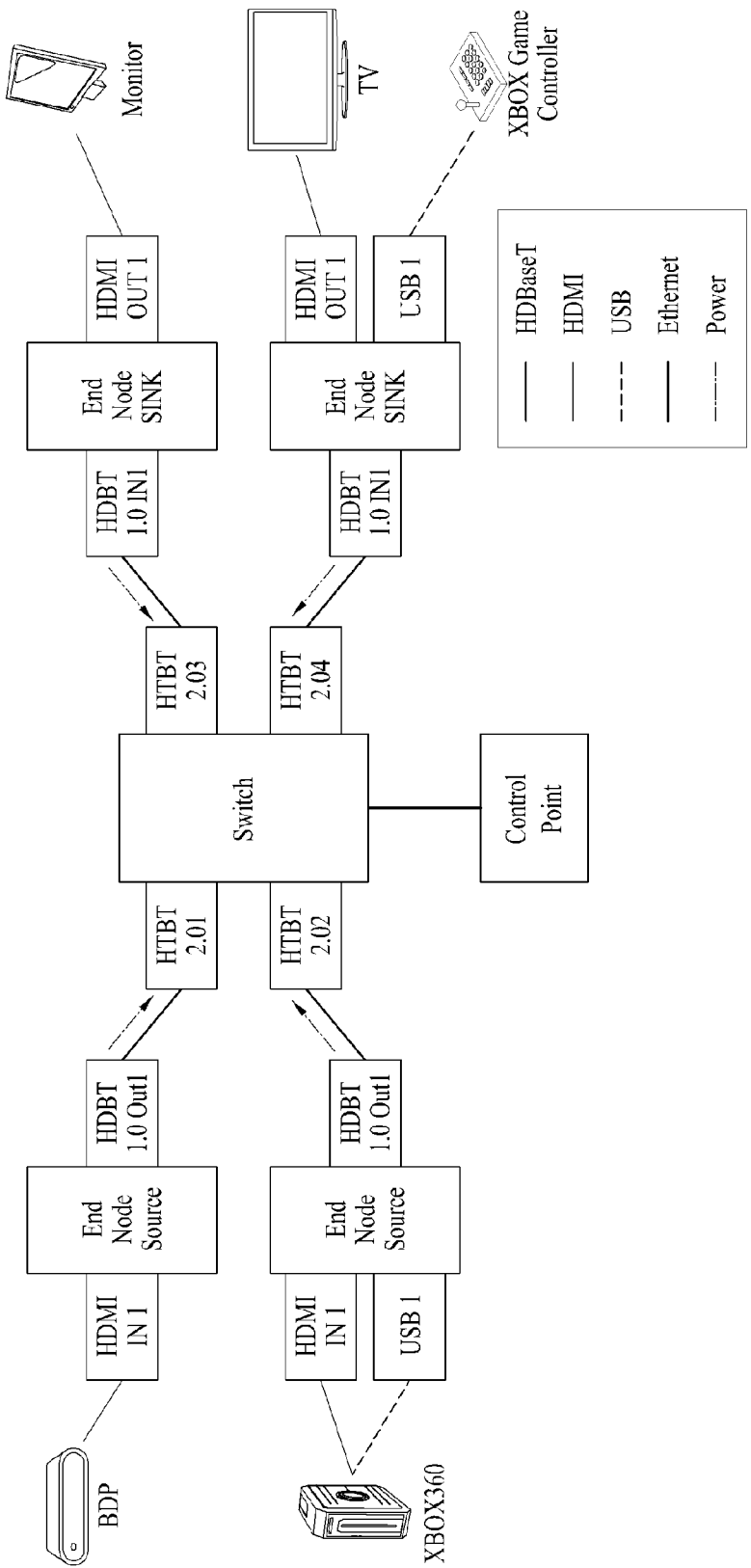
FIG. 10 illustrates a method for performing session routing through a switch according to an embodiment of the present invention.

FIG. 10 illustrates a method for performing session routing through a switch according to an embodiment of the present invention, and FIG. 11 illustrates an updating procedure for a routing table and a device connection table.

Referring to FIG. 10, the HDBaseT network may include a Source Device (e.g., BDP, XBOX, etc.), an End Node Source (or End Node of the Source Device), a Switch, a Control Point, an End Node Sink (or End Node of the Sink Device), and a Sink Device (e.g., Monitor, TV, Game Controller).

The Switch may perform a Device Discovery function (e.g., Node Status Update, Link Status Update, etc.), a Bandwidth monitoring and assignment (or allocation) function, an HDBaseT Session Data Switching function, and an HDBaseT Control Point Protocol function. Also, the switch may acquire link information, switching/routing information, source/sink discovery and control point information from the HDCD.

By transmitting control commands to the switch, the control point may control the path for AV (Audio/Video) and control data.

Referring to FIG. 10, an HDBaseT Session Routing method for 2 HDBaseT Sources (e.g., BDP, XBOX) and 2 HDBaseT Sinks (Monitor, TV) will now be described in detail. In FIG. 10, an AV Stream can only be transmitted from the Source Device, and End Node Sink cannot transmit the AV stream. The End Node Source cannot be the End Node Sink. The HDBaseT link supports one-way AV streaming and two-way data networking. An HDBaseT connection may be set up when an HDBaseT link path of the source node and the destination of the stream are configured by the HDBaseT Switch.

An HDBaseT connection request is blocked (1) when the HDBaseT link and the destination of the stream are not discovered, (2) when damage or loss occurs in one or more HDBaseT link paths, and (3) when one or more HDBaseT link paths are incapable of providing a sufficient bandwidth with respect to the HDBaseT connection request.

The switch manages the bandwidth allocation (or assignment) with respect to the HDBaseT link and also manages an HDBaseT Routing Table, which is based upon a Link Status Algorithm. Before the data are transmitted, the switch sets up the path for each stream request. An HDBaseT packet carries a stream identifier and a destination address. All switches existing within the path maintain a "Link Status" and exchange "Link Status" with other HDBaseT devices.

The switch supports one AV streaming for each HDBaseT port, and the switch cannot combine two or more AV streams by using a single AV Stream ID. An HDBaseT Stream Holding Time may be controlled by the HDBaseT Control Point. The size (or capacity) of each HDBaseT Link is equal to one another.

In FIG. 10, when a switch is turned on an initialized, the switch verifies the status of the available ports, links, and the switch. Then, the switch configures a Switching Routing Table (ref. FIG. 11(a)). In FIG. 11(a), the current switch corresponds to when the power has just been turned on. Therefore, only its available input port is recorded in the Routing Table.

When the HDBaseT end node(s) of the Source Device and/or the Sink Device are/is turned on, the end node configures an available initial port and link. Also, an end node discovery procedure may be perfoi lied.

The End Node reports an initial node status, port status, and/or link status to the switch. The switch reconfigures a port based upon the initial node status, port status, and/or link status received from the end nodes, thereby updating the switch routing table (Ref. FIG. 11(b)). In FIG. 11(b), since the switch receives the initial node status, port status, and/or link status from a Source End node, the identifier of the Source node and the identifier of an HDBaseT stream, which is received from the source, may be updated in the Routing table.

When the power of the Control Point (CP) is turned on, the CP may set up an initial status (or state). Also, the CP verifies the port status, link status, and switch status related to the CP itself and, then, the CP configures a device connection table (Ref. FIG. 11(d)). In FIG. 11(d), since the CP recognizes that the current BDP and XBOX operate as the Source nodes, the CP assigns Source node identifiers to the Device connection table.

Furthermore, the control point performs an HDBaseT switch device discovery procedure. At this point, the CP may configure an Ethernet and a TCP/IP, and the CP may also receive a device connection table from the switch. Thereafter, the CP transmits a control command to the switch and waits (or stands-by) for a response.

After receiving the control command, the switch calculates an HDBaseT Routing path and may reconfigure the ports. Also, in order to set up a routing path and to assign a bandwidth, the switch transmits control messages to the end nodes and updates a switch routing table (Ref FIG. 11(c)). In FIG. 11(c), the switch updates the destination identifier and output port identifier in the routing table based upon the routing path.

When a response is received from the HDBaseT Switch, the CP updates the Device Connection table (Ref. FIG. 11(e)). More specifically, the CP may update the identifier of the Sink Device within the Device Connection Table.

4. Method for Updating Link Status

Figure 12:
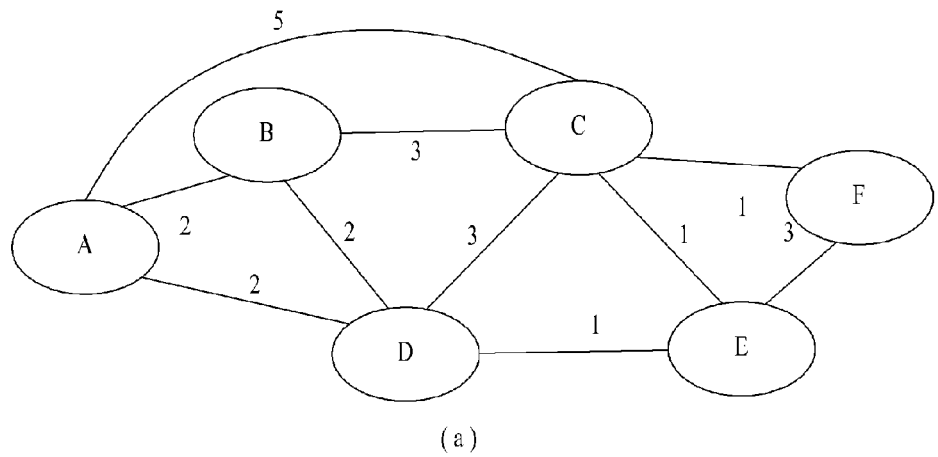
FIG. 12 illustrates an exemplary method for updating a link status according to an embodiment of the present invention.

FIG. 12 illustrates an exemplary method for updating a link status according to an embodiment of the present invention.

Referring to FIG. 12(a), Alphabets A, B, C, D, E, and F represent nodes, and the connection line between each node represents the link. Also, the numbers marked on the connection lines may indicate the bandwidth of the link or the delay coefficient. More specifically, the Link Status packet represents the link connection status between each node.

By periodically transmitting and receiving a Device Status packet or a Device status request message and a Device status response message the switch, information on the neighboring nodes (e.g., Sink Node and Source Node) and information on the activated link may be searched. Also, the switch may calculate and allocate (or assign) bandwidths for the neighboring nodes.

In order to provide information on the bandwidth to the nodes, the switch generates (creates) a Link State (or status) Packet and may send the generated link state packet to all of the nodes existing in the HDBaseT Network via unicast or broadcast.

Each of the nodes may generate a Link State (or status) Database indicating the topology of the entire network based upon the link status packet. Also, the nodes may use a Dijkstra algorithm so as to calculate the shortest path.

The session routing method may include a Link State (or Status) Routing method and a Distance Vector Routing method.

In case of the Link Status Routing method, all routers may carry information on a complete topology within the network and link cost information. In case of the Link Status Routing method, even if the router does not perform normal operations, since each of the nodes has its own Link Status Table, the error is not propagated to the other devices within the network.

In case of the Distance Vector Routing method, all routers are aware of the neighboring nodes that are physically connected to one another and the Link Cost respective to the neighboring nodes. By exchanging the link information between the neighboring nodes, the router may repeatedly calculate the route path. However, in the Distance Vector Routing method, in case the Distance Vector node propagates an erroneous (or incorrect) path value, the error can be easily propagated to other nodes.

Hereinafter, an exemplary Link Status Routing method will be described in detail with reference to FIG. 12.

(1) Step 1: each of the nodes gathers Link Status information from the neighboring nodes (or neighboring devices) and generates a link status packet. The Link Status Packet may include a Sender ID, an Neighbor ID (or Neighboring node ID), and a link cost value. At this point, the link cost may indicate a link delay value or an assigned (or allocated) bandwidth (Ref. FIG. 12(b)).

(2) Step 2: each node delivers Link Status information (i.e., Link Status Packet) to all of the other devices within the network by using a Flooding method. At this point, the link status information may be included in a link status notification (or notify) message, thereby being transmitted.

(3) Step 3: each of the nodes may calculate (or compute) a shortest (or minimum) routing path between a designated Source Device (A) and a designated Sink Device (F). At this point, each of the nodes generates a Global Link Status table indicating the topology of the entire network based upon the received link status information (Ref. FIG. 12(c)). Also, each of the nodes may calculate (or compute) the shortest path by using the link status table and the Dijkstra algorithm. During the process of calculating the Routing path, each not may decide whether to prioritize the link cost or to prioritize the number of hops. Information of the priority levels may be included in the link status packet.

(4) Step 4: each of the nodes calculates (or computes) a local routing table. Each of the nodes may calculate (or compute) a transmission port for each destination based upon the shortest (or minimum) path information from the source node to the target node. And, then each node may reflect the calculated transmission port to the routing table (Ref. FIG. 12(d)). Referring to FIG. 12(d), it is apparent that the shortest path from Source Node A to Target node F corresponds to a path starting from Source node A passing through Node C to Target Node F, via a link connected to Transmission Port 1 of Source Node A. Furthermore, referring to the Routing Table, the routing path from Source Node A to each Target Node and the transmission port identifier of Source Node A can be easily known.

5. Session Routing Table

Figure 13:
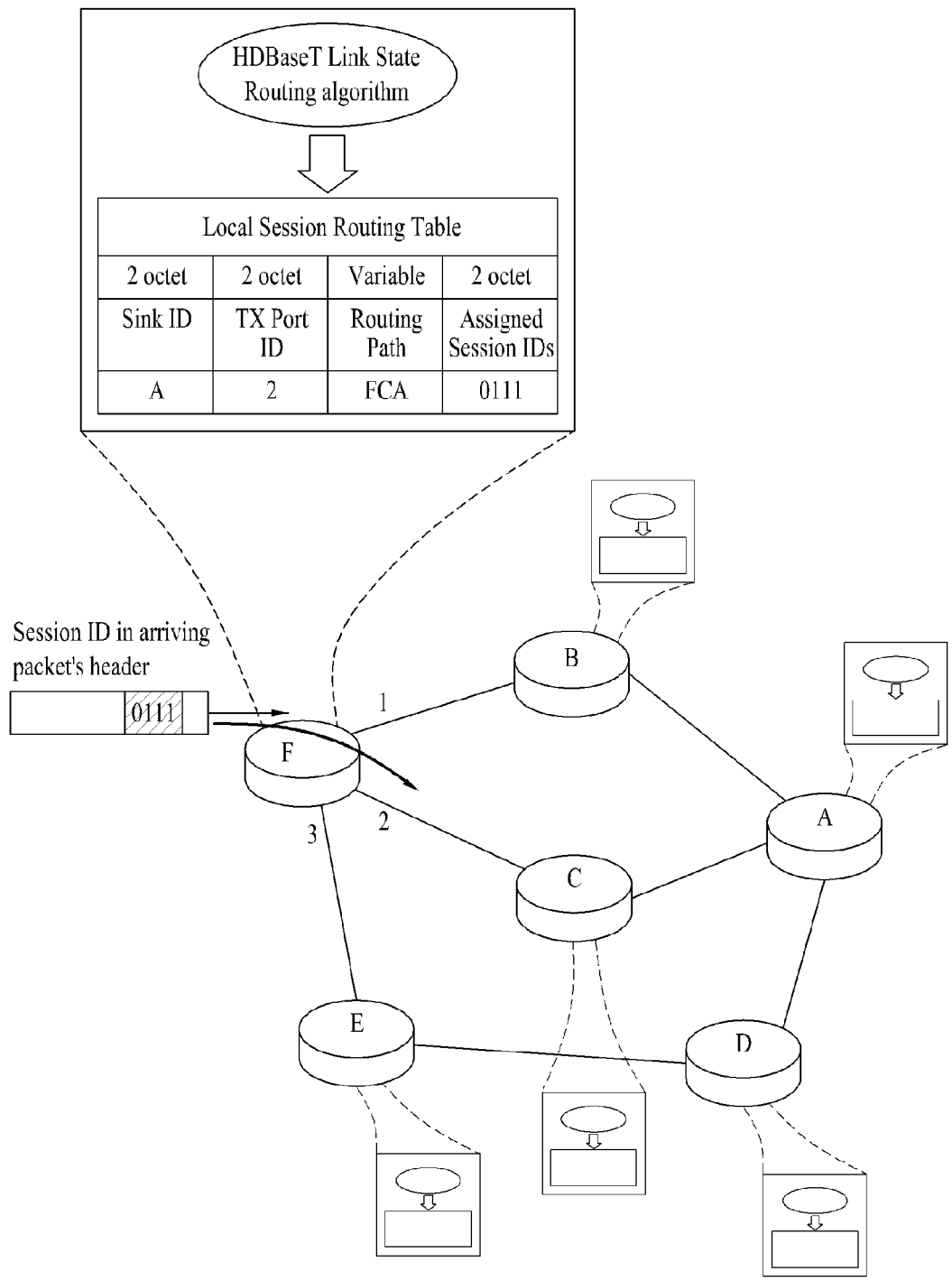
FIG. 13 illustrates one of the HDBaseT session routing methods according to an embodiment of the present invention.

FIG. 13 illustrates one of the HDBaseT session routing methods according to an embodiment of the present invention.

In order to support session routing, the switch and/or nodes within the HDBaseT Network monitor the link status and may discover an optimal path in accordance with the monitored link status.

The Link Status Routing method may be applied to the HDBaseT Session Routing method. After receiving the Link Status Request message, each of the HDBaseT devices transmits Local connectivity information, such as Link Status, to a Routing Processor of other devices.

The Routing Processor of each of the HDBaseT devices may gather and update the link status, may configure the entire network topology, and may calculate the path for all of the destinations by using the configured network topology. Since the routing processor is aware of the network topology, the dependence of the routing processor on other nodes during the routing calculation is low.

The Routing Processor may also be referred to as an RPE (Routing Processor Entity), and the Routing Processor may be included in the HDBaseT devices. Referring to FIG. 13, a case where the RPE is included in the switch will be described in detail.

The Routing Processor and/or SDME of the Switch may calculate an optimal path from the source to the sink and may also calculate session routing information based upon the link status information. All of the HDBaseT devices carry a link status table, which indicates Global Topology Information and Link Cost Information.

The Link Status Table may be set up and updated by exchanging Link Status Notification (or Notify) messages. The Link Status Notify messages include a transmission port identifier designating a specific HDBaseT Link, bandwidth information, and active session information and a reception port identifier.

The HD-CMP packet or the HD-CMP packet within an HLIC is used for transmitting session routing information including information types, such as Link Status Notify messages, Session Initiate Request messages and Session Initiate Response messages, Session Route Request messages and Session Route Response messages, Session Release Request messages and Session Release Response messages, and so on.

The HD-CMP packet within the HLIC allows the end node within an edge link of a sub network to exchange HD-CMP messages.

Figure 14:
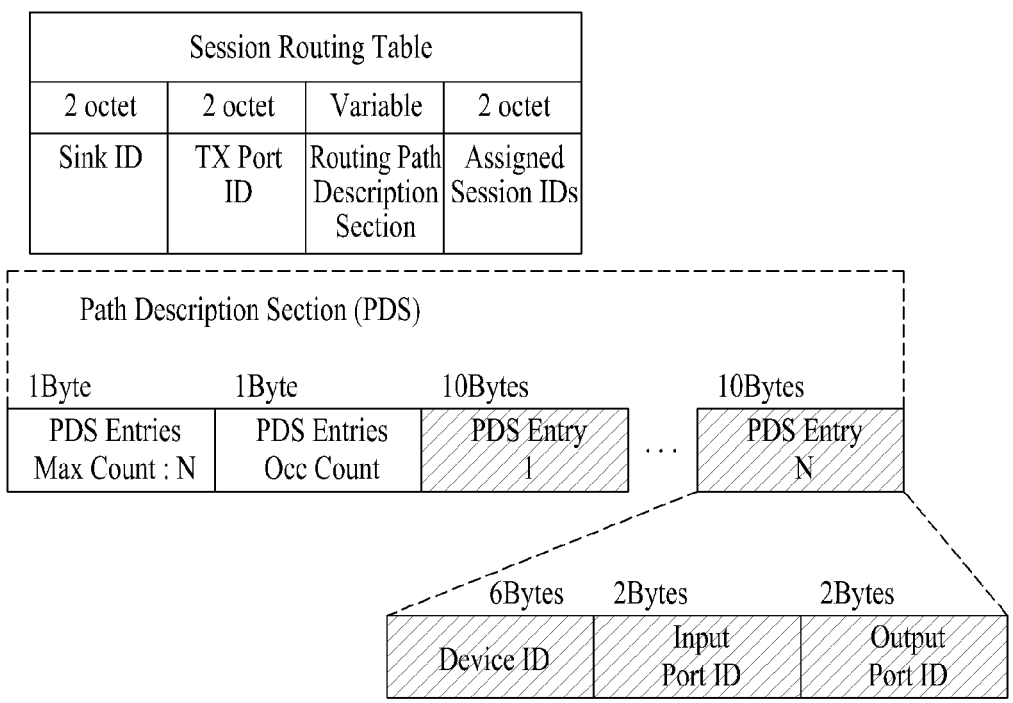
FIG. 14 illustrates an exemplary session routing table format used in the embodiments of the present invention.

FIG. 14 illustrates an exemplary session routing table format used in the embodiments of the present invention.

A Routing table is used for managing session routing information of all transmission ports (Tx Ports) available to the HDBaseT devices. Based upon the path information from the source to the destination calculated by the routing processor entity (RPE), the RPE computes (or calculates) a transmission port identifier for each destination and may update the transmission port identifier of the session routing table belonging to the RPE itself.

Referring to FIG. 14, the session routing table may be generated (or created) based upon an HDBaseT Link Status Routing Algorithm. At this point, the session routing table may include a 2-byte (or 2-octet) Sink Identifier field, a 2-byte transmission port identifier (Tx Port ID) field, a Routing Path Description Section field, and an assigned session identifier (Assigned Session ID) field.

The Sink ID field indicates a device identifier identifying the Sink Device, and the Tx Port ID field identifies a transmission port of a device transmitting the corresponding message, and the Routing path represents path information starting from a source node to a sink node, which is designated by a PDS of an HD-CMP message. Furthermore, the Assigned Session ID field is used for identifying active sessions within the transmission port identifier of the HDBaseT device.

The session routing table may be independently set up, maintained, and managed by source nodes, sink nodes, a switch, and/or T-Adaptors existing within the HDBaseT Network. For example, by periodically transmitting and receiving control information related to the routing table to and from each node, the switch may update the session routing table.

Figure 15:
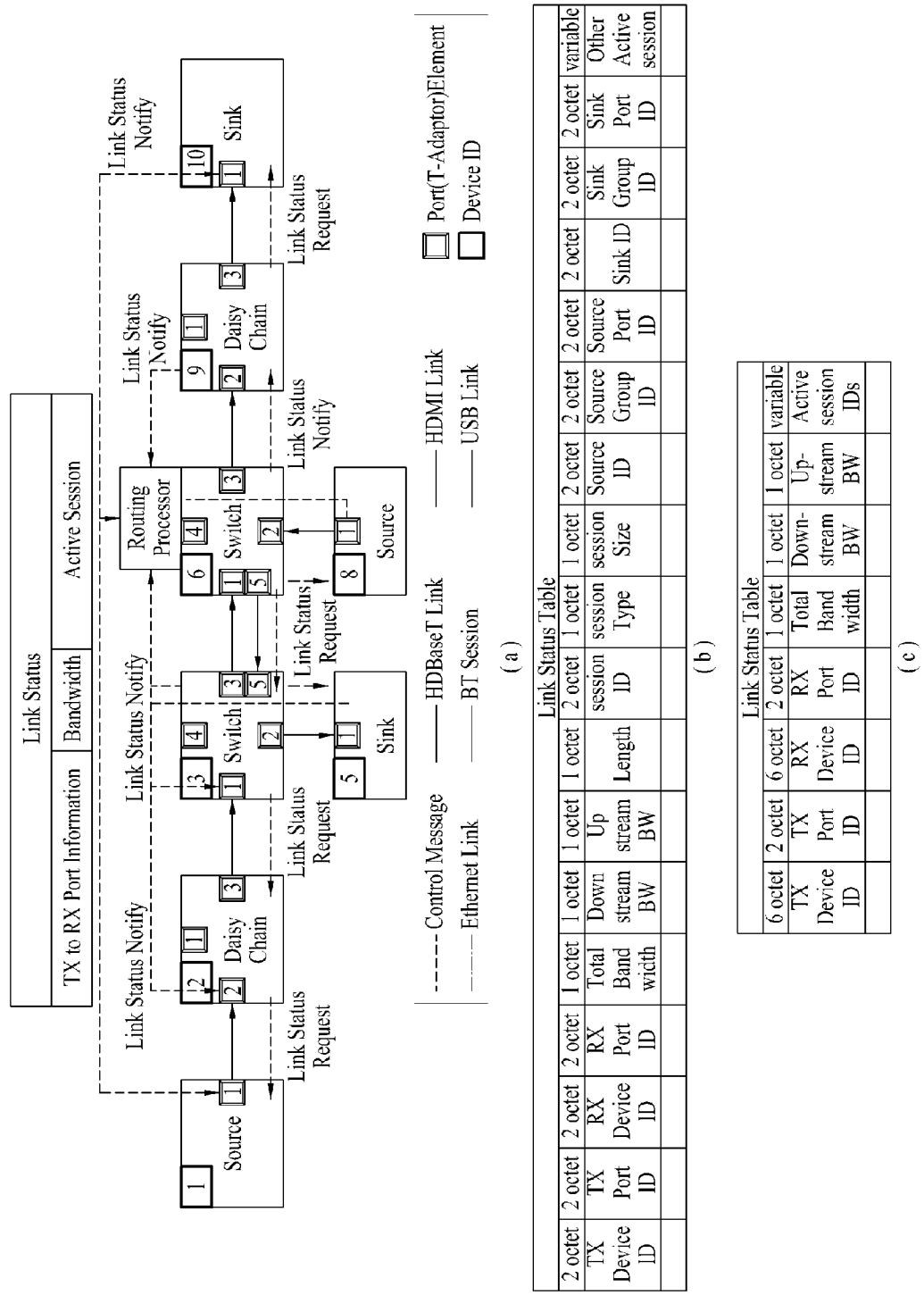
FIG. 15 illustrates an exemplary link status updating method for setting up a route path according to an embodiment of the present invention.

FIG. 15 illustrates an exemplary link status updating method for setting up a route path according to an embodiment of the present invention.

The management of a Link status (or state) is based upon "Link Status Notify messages" that are Flooded. Each of the HDBaseT devices may manage Session Routing Information from valid Link Status Notify messages. Also, the Routing Processor or Routing Processor Entity (RPE) of each HDBaseT device may transmit a Link Status Request message, which requests for link information via Ethernet network or HDBaseT network, to other HDBaseT entities in the form of unicast or broadcast. However, each node is not required to periodically broadcast the link status information.

The Link Status information may be exchanged between the HDBaseT devices (i.e., Routing Processors). If a specific routing processor receives a Link Status Request message requesting for Link information from another routing processor, the specific routing processor shall transmit a Link Status response including all Link status information of all of the devices to the other routing processor.

If the HDBaseT device receives a new Link Status notify message from another HDBaseT device, the Link status information included in the link status notify information is reflected to the link status table, which is managed by the HDBaseT device.

FIG. 15(a) illustrates an example of the link status request message and the link status notify message being transmitted and received within the HDBaseT network. Referring to FIG. 15(a), a link status request message may be transmitted from a switch device having a device identifier of '6' to a source node, a sink node, a daisy chain, and other switches for session routing. Having received the link status request information, the source node, the sink node, the daisy chain, and the other switches delivers a link status notify message including a link status table, which is managed by each of the source node, the sink node, the daisy chain, and the other switches, to the routing processor of the corresponding switch. Based upon the link status information included in the link status notify message, the routing processor of the switch device may compute (or calculate) an optimal routing path.

At this point, the link status information may include a Port information field with respect to a transmission port to a reception port (Tx to Rx Port Information field), a Bandwidth field indicating the bandwidth of the corresponding link, and an Active Session field indicating an activated session.

Although FIG. 15(a) illustrates an example wherein the routing processor is provided in a switch having a device identifier of '6', the routing processor may also be provided in source nodes, sink nodes, and/or other switches.

The routing processor calculates an optimized path from a source node to a sink node, and, based upon the acquired link status information, the routing processor delivers session routing information including information on the routing path starting from the source node to the sink node. For this, the routing processor configures and manages a link status table and a session routing table. Furthermore, based upon the path calculated from the source to the destination, the TX port for each target node is calculated, and the routing table may be updated accordingly.

The routing processor uses the Dijkstra algorithm and the link status table so as to calculate the optimized routing path for all devices. The Link Cost is decided based upon the bandwidth assigned to each link or path delay.

According to the embodiments of the present invention, the session routing method uses the link status routing has a 3-level route selection priority level. First of all, a low cost (i.e., low assigned bandwidth and low congestion) level is based on an assigned bandwidth. If session data being assigned with a link do not exist, the link cost is equal to '0'.

In case of a highest possible bandwidth level of the route, the link cost is based on the entire bandwidth of the corresponding link. At this point, the link cost is calculated as 1/(entire bandwidth of the corresponding link).

In case of a small number of hops level, the link cost varies in accordance with the number of hops. If a device has a link (Tx Port) connected to another device, the cost of the corresponding link is equal to '1'.

The 3-level route selection priority level is optional (or selective) and may be adaptively used in accordance with the user's request.

The method for setting up and updating the routing path described in FIG. 15(a) can be recapitulated as follows.

(1) By exchanging a device status request message and a device status response message with another HDBaseT device, a first HDBaseT device may search for a neighboring HDBaseT device.

(2) An RPE equipped in the first HDBaseT device transmits a link status request message for requesting link information to a second HDBaseT device.

(3) The second HDBaseT device receiving the link status request message generates a link status notify message including its own link status information, and then the second HDBaseT device delivers the generated link status notify message to the first HDBaseT device and other HDBaseT devices.

(4) The RPE of the first HDBaseT device collects (or gathers) link status notify messages and updates link information included in the link status notify message to the link status table, which is managed by the RPE of the first HDBaseT device itself.

(5) The RPE uses the Dijkstra algorithm so as to calculate (or compute) an optimal routing path for all HDBaseT devices from the link status table.

(6) Based upon the information on the optimal path from the source node to the target node, the RPE may calculate (or compute) a transmission port for each destination from the first HDBaseT device.

FIG. 15(b) illustrates an exemplary Link Status Table structure. According to the embodiments of the present invention, the link status table corresponds to link status information for managing a link status of the devices included in the HDBaseT Network. Herein, when one device receives new link status notify packets from another device, the link status notify packets are reflected on the link status table.

Referring to FIG. 15(b), the link status table may include a transmission device identifier (Tx Device ID) field identifying a sender transmitting (or sending) link status information, a transmission port identifier (Tx Port ID) field identifying a transmission port of the sender, a reception device identifier (Rx Device ID) for identifying a receiver, a reception port identifier (Rx Port ID) for identifying a reception port of the receiver, a Total Bandwidth field indicating the total bandwidth of the corresponding link, a Downstream bandwidth (Downstream BW) field indicating the bandwidth of a Downstream, an Upstream bandwidth (Upstream BW) indicating the bandwidth of an Upstream.

Also, the link status table may further include a Length field indicating the total length of the link status table, a session identifier (Session ID) field identifying a session set up in the corresponding link, a Session Type field indicating the type of the corresponding session, and a Session Size field indicating the size of the corresponding session.

Moreover, the link status table may further include a source identifier (Source ID) field identifying a source device that provides contents, a source group identifier (Source Group ID) field identifying a source group, a source port identifier (Source Port ID) field identifying a port of the source device, a Sink identifier (Sink ID) field identifying a sink device that is being provided with contents, a sink group identifier (Sink Group ID) field identifying a sink group, a sink port identifier (Sink Port ID) field identifying a port of the sink device, and an Other Active Session field including information on other active sessions.

FIG. 15(c) illustrates another exemplary Link Status Table. As a structure compressing the fields included in the link status table of FIG. 15(b), the Link Status Table of FIG. 15(c) is configured of a structure including only a transmission device identifier field, a transmission port identifier field, a reception device identifier field, a reception port identifier field, a total bandwidth field, a downstream bandwidth field, an upstream bandwidth field, and an active session identifier. However, the size of each field is difference from those of FIG. 15(b).

Figure 16:
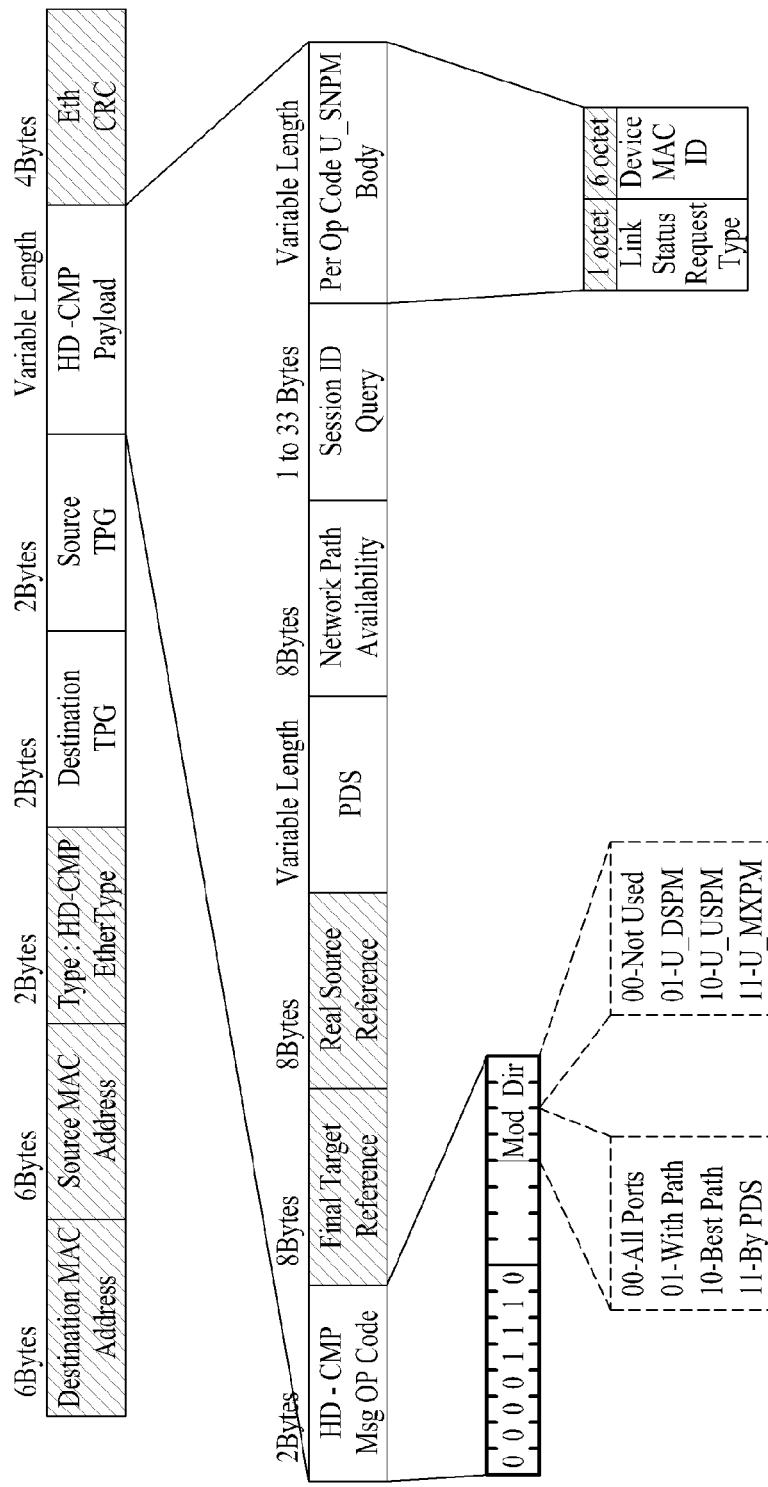
FIG. 16 illustrates an exemplary link status request message structure used in the embodiments of the present invention.

FIG. 16 illustrates an exemplary link status request message structure used in the embodiments of the present invention.

The Link Status request message is used for requesting Link status information of HDBaseT links. The Link Status Request message may be transmitted between both management entities within the HDBaseT Network in the form of an Ethernet message.

Referring to FIG. 16, the Link Status Request message may include a destination device identifier field (Destination MAC address field) for identifying a destination management entity to which the link status request message is directly delivered, a source device identifier field (Source MAC Address field) for identifying a management entity transmitting the link status request message, a type field indicating that the type of the link status request message is an HD-CMP Ethernet packet, a destination TPG field for identifying a port device of the destination, a source TPG field for identifying a port of the management entity transmitting the link status request message, and an HD-CMP payload.

Also, the HD-CMP payload may include an HD-CMP message operation Code (HD-CMP Msg Op Code) field indicating that the message is being used for a link status request, a FTR (Final Target Reference) field, a RSR (Real Source Reference) field, a PDS (Path Description Section) field indicating a path from the source node to the sink node, an NPA (Network Path Availability) field indicating an available network path, an SIQ (Session ID Query) field, and an Op Code U_SNPM body field, which is an HD-CMP payload.

The HD-CMP Msg Op code field may include a Mod field indicating a method for delivering a session status request message to another device, and a Dir field indicating the direction to which the session initiate request message is being transmitted.

According to the embodiments of the present invention, being a field assigned with 2 bits, the Mod field may indicate that the message is delivered to all ports connected to the corresponding device (00), that the message is delivered to a designated port so that the message can be delivered to a routing path known by the device (01), that the message is delivered to a designated port so that the message can be delivered to a single optimal routing path (10), or that the message is delivered to a path defined by the PDS field (11). Additionally, the Dir field indicates the delivery direction of a message. Herein, the Dir field may indicate a downlink stream (DL) (01), an uplink stream (US) (10), or a two-way stream (mixed path) (11).

The FTR (Final Target Reference) field is used for identifying a session partner (e.g., management entity of the final destination), which is to be finally transmitted through the HDBaseT Network, and the source reference field (RSR (Real Source Reference) field) is used for identifying a first initiation (or initiate) entity, which has transmitted the session status request message. For example, the final target reference field corresponds to an 8-bit field, which may include a MAC address identifying a management entity of a session partner, which corresponds to the destination, and a TPG identifier identifying a port device of the session partner. The source reference (RSR) field corresponds to an 8-bit field, which may include a MAC address of a management entity included in the initiation entity and a TPG identifier identifying the port device of the initiation entity.

The Op Code U_SNPM body field may include a Link Status Request Type field indicating the type of the link status request, and a Device ID or Device MAC address for identifying the management entity of the source device.

Figure 17:
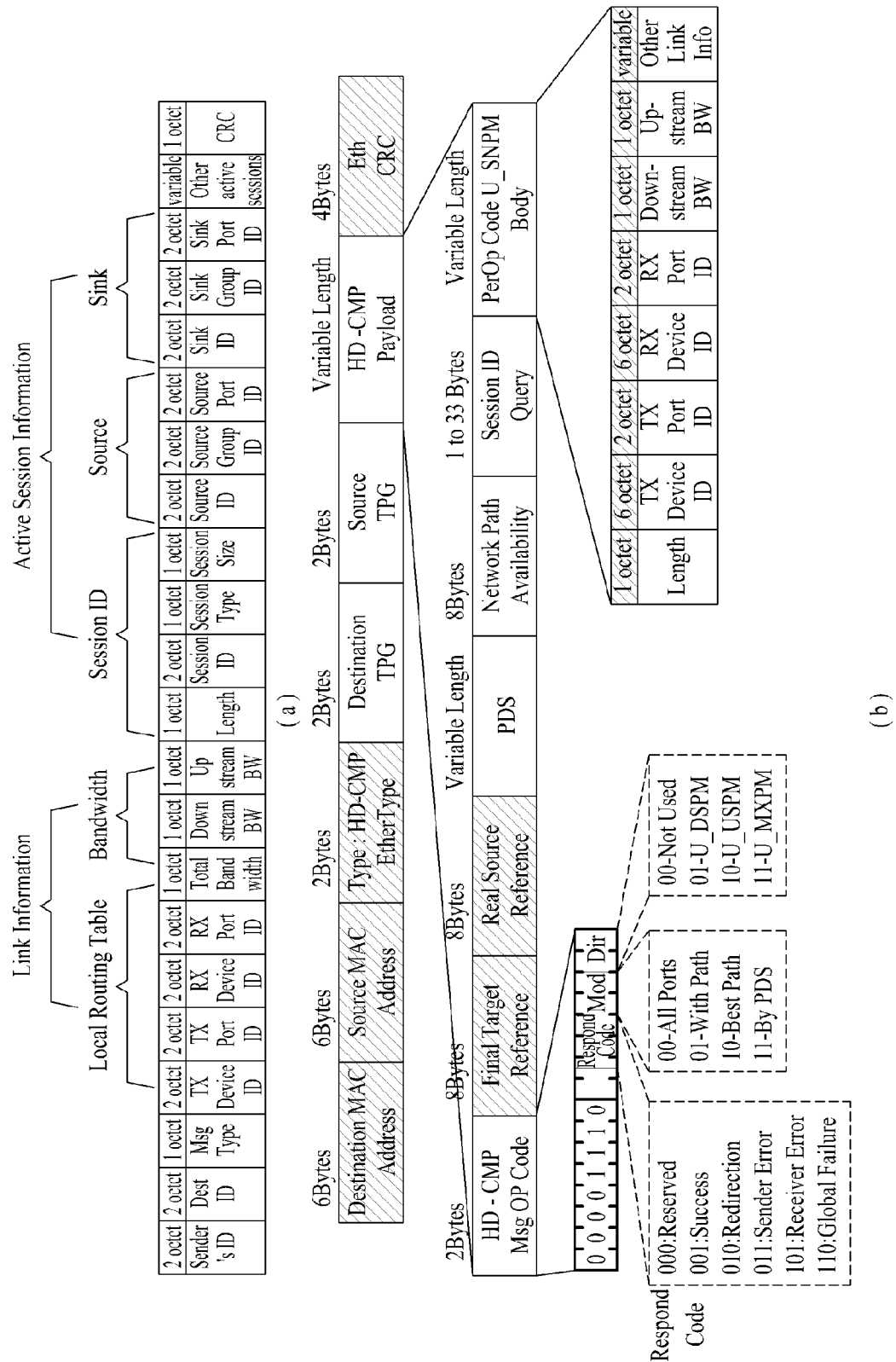
FIG. 17 illustrates structures of link status notification (or notify) messages used in the embodiments of the present invention.

FIG. 17 illustrates structures of link status notification (or notify) messages used in the embodiments of the present invention.

The routing processor entity (RPE) of the HDBaseT device may acquire Session Routing Information from a valid Link status notify message. At this point, the RPE reflects session routing information on the session routing table, which is managed by the RPE itself, thereby updating the session routing table.

FIG. 17(a) illustrates an exemplary link status notify message structure. Referring to FIG. 17(a), the link status notify message may include a sender identifier (Sender ID) field identifying the device transmitting the corresponding message, a Destination identifier (Destination ID) field identifying the subsequent destination device to which the message is to be transmitted, a message type (Msg Type) field indicating the type of the corresponding message, a transmission device identifier (Tx Device ID) field identifying a source device (e.g. BDP), a transmission port identifier (Tx Port ID) field identifying a transmission port of the source device, a reception device identifier (Rx Device ID) for identifying a sink device (e.g. TV), which is provided contents from the source device via a created session, a reception port identifier (Rx Port ID) for identifying a reception port of the sink device, a Total Bandwidth field indicating the total bandwidth of the corresponding link, a Downstream bandwidth (Downstream BW) field indicating the bandwidth of a Downstream, an Upstream bandwidth (Upstream BW) indicating the bandwidth of an Upstream.

Also, the link status notify message may further include a Length field indicating the total length of the link status notify message, a session identifier (Session ID) field identifying a session set up in the corresponding link, a Session Type field indicating the type of the corresponding session, and a Session Size field indicating the size of the corresponding session. At this point, the session type field indicates which of the HDMI data, Ethernet data, USB data, and/or IR data are included in the corresponding session.

Moreover, the link status notify table may further include a source identifier (Source ID) field identifying a source device that provides contents, a source group identifier (Source Group ID) field indicating a source group port number, when the corresponding session is coupled with another session, a source port identifier (Source Port ID) field identifying a session source port of the source device, a Sink identifier (Sink ID) field identifying a sink device that is being provided with contents, a sink group identifier (Sink Group ID) field indicating a sink group port number, when the corresponding session is coupled with another session, a sink port identifier (Sink Port ID) field identifying a port of the sink device, and an Other Active Session field including information on other active sessions.

At this point, when the source device supports session coupling, the source group port number may be set up as a non-zero value. And, when the sink device supports session coupling, the sink group port number may also be set up as a non-zero value.

In FIG. 17(a), the Link Status Notify message may be configured of link information and active session information. Also, the link information includes local routing table information and bandwidth information. At this point, the local routing table information includes a transmission device identifier field, a transmission port identifier field, a reception device identifier field, a reception port identifier field, and a total bandwidth field. Herein, the local routing table information is used for updating the routing table of each HDBAseT device.

The active session information is configured of session identifier information, source device information, and sink device information. At this point, the session identifier information includes a length field, a session identifier field, a session type field, and a session size field. And, the source device information includes a source identifier, a source group identifier, and a source port identifier, and the sink device information include a sink identifier, a sink group identifier, and a sink port identifier field.

FIG. 17(b) illustrates another exemplary link notify message structure. Referring to FIG. 17(b), the link status notify message may include a Destination MAC address field for identifying a subsequent destination management entity to which the corresponding message is to be delivered, a source device (Source MAC Address) for identifying a management entity transmitting the link status request message, a type field indicating that the type of the link status request message is an HD-CMP Ethernet packet, a destination TPG field for identifying a port device of the destination, a source TPG field for identifying a port of the management entity transmitting the link status request message, and an HD-CMP payload.

Also, the HD-CMP payload may include an HD-CMP message operation code field (HD-CMP Msg Op Code field) indicating that the message is being used for a link status notify, a FTR (Final Target Reference) field, a RSR (Real Source Reference) field, a PDS (Path Description Section) field indicating a path from the source node to the sink node, an NPA (Network Path Availability) field indicating an available network path, an SIQ (Session ID Query) field, and an Op Code U_SNPM body field, which is an HD-CMP payload.

The HD-CMP Msg Op code field may include a Mod field indicating a method for delivering a link status notify message to another device, and a Dir field indicating the direction to which the link status notify message is being transmitted.

According to the embodiments of the present invention, being a field assigned with 2 bits, the Mod field may indicate that the message is delivered to all ports connected to the corresponding device (00), that the message is delivered to a designated port so that the message can be delivered to a routing path known by the device (01), that the message is delivered to a designated port so that the message can be delivered to a single optimal routing path (10), or that the message is delivered to a path defined by the PDS field (11). Additionally, the Dir field indicates the delivery direction of a message. Herein, the Dir field may indicate a downlink stream (DS) (01), an uplink stream (US) (10), or a two-way stream (mixed path) (11).

The FTR (Final Target Reference) field is used for identifying a session partner (e.g., management entity of the final destination), which is to be finally transmitted, and the source reference field (RSR (Real Source Reference) field) is used for identifying an initiation (or initiate) entity, which initially transmits the link status notify message. For example, the final target reference field corresponds to an 8-bit field, which may include a MAC address identifying a management entity of a session partner, which corresponds to the destination, and a TPG identifier identifying a port device of the session partner. The source reference (RSR) field corresponds to an 8-bit field, which may include a MAC address of a management entity included in the initiation entity and a TPG identifier identifying the port device of the initiation entity.

The Op Code U_SNPM body field may include a Length field indicating the total length of the Op Code U_SNPM body field, a transmission device identifier (Tx Device ID) field identifying the transmission device, a transmission port identifier (Tx Port ID) identifying the transmission port of the transmission device, a device identifier (Rx Device ID) field of neighboring devices positioned in between, a reception port identifier (Rx Port ID) field indicating the reception port identifiers of the neighboring devices positioned in between, a Downlink stream bandwidth (Downstream BW) field indicating the available bandwidth of the downstream link, an Uplink stream bandwidth (Upstream BW) field indicating the available of the upstream link, and an Other Link information (Other Link Info.) field including information on other links.

The Link Status Notify message may use a unicast SNPM (U_SNPM) packet so as to be transmitted between the management entities of the HDBaseT network. According to the embodiments of the present invention, the term session may be used as the same meaning as the term link. Also, the term Link Status (or State) Message may be used as the same meaning as the term Session Status (or State) Message.

Figure 18:
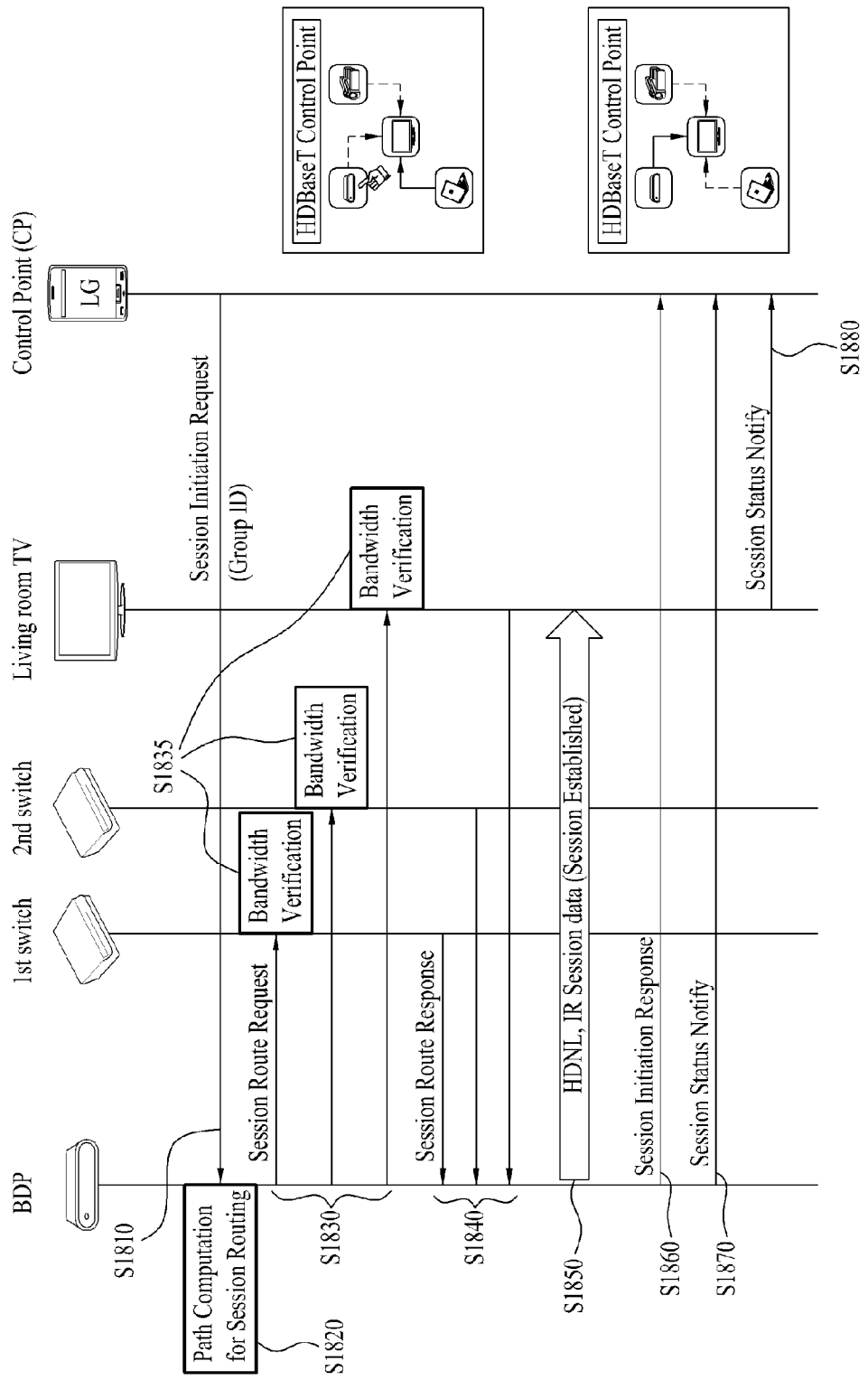
FIG. 18 illustrates an exemplary session routing method according to an embodiment of the present invention.

FIG. 18 illustrates an exemplary session routing method according to an embodiment of the present invention.

FIG. 18 illustrates a case where a session initiation if requested by the control point. The HDBaseT devices disclosed in the present invention may support DSR (Distributed Session Routing) method and CSR (Centralized Session Routing) method. However, FIG. 18 may be applied to all cases using the DSR method and the CSR method. The CSR method may be used in a case where the RPE (Routing Processor Entity) is realized in the CPME function of the HDBaseT network.

The combination of the RPE and the CPME may verify and maintain the total topology and state (or status) of each link within the network. The combination of the RPE and the CPME may calculate an optimized path for each session and a valid session identifier (SID), when each session is being configured. The RPE/CPME combination may be realized in an end node, a switch, or a pure Ethernet device. Since the function of the RPE/CPME combination is capable of performing fast route/SID calculation, a session may be configured much more quickly. The RPE/CPME combination uses a Knowledge Base, and the RPE may provide session route calculation in accordance with the request made by the management entity.

In FIG. 18, it is assumed that the RPE/CPME combination is configured in an end node (e.g., BDP or CP, etc.) and/or a switch. Referring to FIG. 18, all HDBaseT devices that are currently available for access may be displayed on the screen of the control point (CP). At this point, when the user selects a Blu-ray Disc player (BDP) as the source provider, the CP may select the HDMI source T-Adaptor of the BDP as the first partner entity, and the CP may select the HDMI Sink T-Adaptor of the TV as the second partner entity. Also, in order to verify the availability and requirements for performing session configuration of the partner entities, the CP, which corresponds to an initiation entity, may transmit a Session Initiate Request message including the session group identifier to the BDP (S1810).

In step S1810, the Session Initiate Request message may include an HD-CMP Msg OpCode field, a Final Target Reference field, a Real Source Reference field, a PDS (Path Description Section) field, an NPA (Network Path Availability) field indicating an available network path, an SIQ (Session ID Query) field, and an Op Code U_SNPM body field, which is an HD-CMP payload.

At this point, the FTR (Final Target Reference) field is used for identifying a session partner (e.g., management entity of the final destination) that is to be transmitted, and the source reference field (RSR (Real Source Reference) field) is used for identifying an initiation (or initiate) entity, which transmits the Session Initiate Request message. For example, the final target reference field corresponds to an 8-bit field, which may include a MAC address identifying a management entity of a session partner, which corresponds to the destination, and a TPG identifier identifying a port device of the session partner. The source reference (RSR) field corresponds to an 8-bit field, which may include a MAC address of a management entity included in the initiation entity and a TPG identifier identifying the port device of the initiation entity.

The Final Target Reference (FTR) field may also be referred to as an FDER (Final Destination Entity Reference) field, and the source reference field may also be referred to as an RSER (Real Source Entity Reference) field.

The PDS field is included in the payload of the HD-CMP message, and the PDS field includes information of the PDS entities indicating the input port for each Device and the output port from each device. More specifically, the PDS field indicates the routing path from the source node to the sink node. The NPA field is included in the payload of the HD-CMP message, and the NPA field indicates the data size that can be processed and the number of accumulated streams. The SIQ field is used for searching activated/already assigned session identifiers from the network path.

Therefore, the final target reference field included in the Session Request message indicates the BDP, which corresponds to the final destination, and the source identifier field identifies the BDP, which corresponds to the Source device. And, the Sink identifier field may indicate the TV positioned in the living room, which corresponds to the display device.

However, since FIG. 18 shows an example of only the Group ID being set up in the Session Initiate Request message, the CPME of the CP may determine all T-Adaptors that can be connected to the first partner (i.e., BDP) and the second partner (i.e., living room TV), so as to direct (or instruct) session configuration.

In FIG. 18, the BDP may operate as the Session initiator. The BDP may include a routing processor entity (RPE) that manages Global Link Status information and a routing table from the BDP to the TV. Accordingly, having receiving the Session Initiate Request message, the RPE of the BDP may calculate the routing path (S1820).

Furthermore, the BDP may search for an optimized path in order to provide the contents to the living room TV, and the BDP may also transmit a Session Route Request message to each of the first switch ($1^{st}$ Switch), the second switch ($2^{nd}$ Switch), and the Living Room TV in order to connect the session (S1830).

Having respectively received the Session Route Request message, the 1st Switch, the $2^{nd}$ Switch, and the Living Room TV may check the bandwidth for each session routing (S1835).

Figure 19:
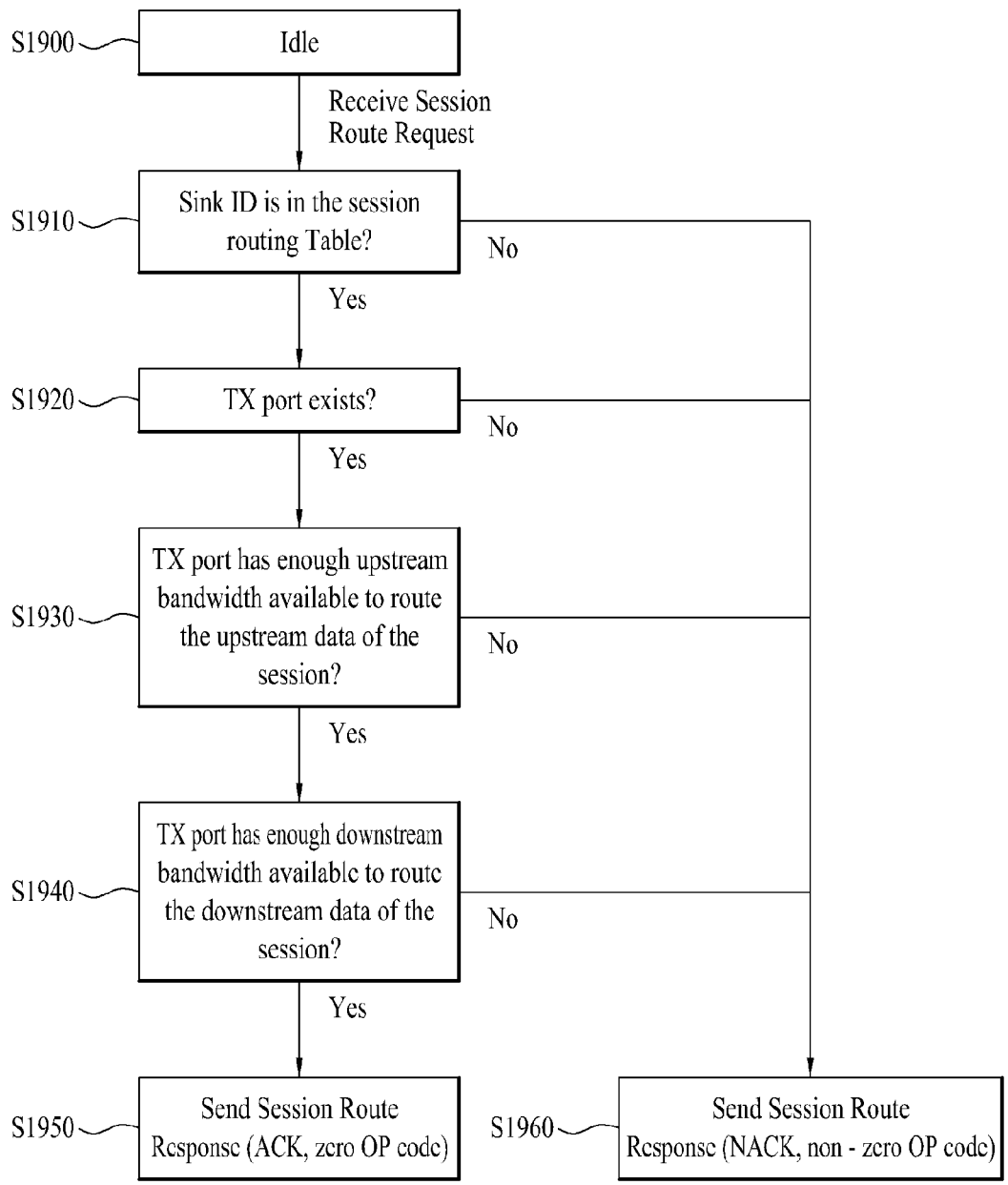
FIG. 19 illustrates a method of checking a bandwidth for session routing according to an embodiment of the present invention.

Reference may be made to FIG. 19 for the description of the method for checking a bandwidth for session routing from each switch and sink device. FIG. 19 illustrates a method of checking a bandwidth for session routing according to an embodiment of the present invention.

Referring to FIG. 19, the initial state of the switch and/or the HDBaseT device corresponds to an Idle state (S1900).

When the switch and/or the HDBaseT device receive(s) a Session Route Request message, the switch and/or the HDBaseT device verifies whether or not a Sink identifier field included in the session route request message is also included in the session routing table, which is managed by the switch and/or the HDBaseT device (S1910).

The switch and/or the HDBaseT device verify (or verifies) whether or not a transmission port (Tx Port) exists (S1920).

If the Transmission port exists, the switch and/or the HDBaseT device verify (or verifies) whether or not the upstream bandwidth is sufficient for routing the uplink stream data of the corresponding session (S1930), and the switch and/or the HDBaseT device also verify (or verifies) whether or not the existing transmission port supports a downstream bandwidth sufficient for routing the downlink stream data (S1940).

In case each of the downstream bandwidth and the upstream bandwidth has a bandwidth sufficient for transmitting and receiving downlink stream data and uplink stream data, the switch and/or the HDBaseT device transmit(s) a Session Route Response message, which includes ACK information, and zero OP Code (S1950).

If it is verified in step S1910 that the Sink identifier is not included in the Session Routing table, or if it is verified in step S1920 that a transmission port does not exist, or if it is verified in step S1930 that a sufficient upstream bandwidth is not provided, or it is verified in step S1940 that a sufficient downstream bandwidth is not provided, the switch and/or the HDBaseT device transmit(s) a Session Route Response message, which includes NACK information and non-zero OP code (S1960).

Referring back to FIG. 18, after performing the bandwidth checking process, which is described in FIG. 19, the $1^{st}$ Switch, the $2^{nd}$ Switch, and the Living Room TV may transmit a Session Route Response message to the BDP. At this point, the Session Route Response message may further include information on an active session associated to the BDP. Furthermore, it is preferable that the $1^{st}$ Switch, the $2^{nd}$ Switch, and the Living Room TV respectively notify whether or not the transmission port and reception port of the $1^{st}$ Switch, the $2^{nd}$ Switch, and the Living Room TV are sufficient for routing the session data to the BDP through the Session Route Response message (S1840).

Additionally, the $1^{st}$ Switch, the $2^{nd}$ Switch, and the Living Room TV may update information on the configured session to each session routing tables belonging to the $1^{st}$ Switch, the $2^{nd}$ Switch, and the Living Room TV.

A session between the BDP and the Living Room TV is configured by performing step S1830 and step S1840, and the BDP may transmit the HDMI data and/or IR data to the Living Room TV through the set up path (S1850).

In order to report the result of the configured session, the BPD transmits a Session Initiation Response message to the control point (S1860).

In step S1860, the Session Initiation Response message may include an HD-CMP Msg OpCode field, a Final Target Reference field, a Real Source Reference field, a PDS (Path Description Section) field, an NPA (Network Path Availability) field indicating an available network path, an SIQ (Session ID Query) field, and an Op Code U_SNPM body field, which is an HD-CMP payload.

The HD-CMP Msg OpCode of the Session Initiation Response message may include a Response Code. The Response code field corresponds to a 3-bit field, which indicates that a Session Initiation Request is successful (i.e., Success), or which indicates that a request is attempted from another device (i.e., redirection), or which indicates that the request is not completed due to the existence of an error and that a request may be re-attempted once the error is corrected (i.e., Sender Error), or which indicates that the request is not completed due to the existence of an error in the recipient and that a request may be re-attempted once the error is corrected (i.e., Receiver Error), or which indicates that the Session Initiation Request has failed that the request is not reattempted (i.e., Global Failure).

The Final Target Reference (FTR) field may be used for identifying an initiation entity (i.e., CP), which has transmitted the Session Initiation message, and the Source reference (RSR) field may be used for identifying a Session Partner management entity (i.e., BDP), which transmits the Session Initiation Response message. At this point, the Final Target Reference field may include a MAC address identifying a management entity, which is included in the initiation entity, and a TPG identifier identifying a port device of the initiation entity. Additionally, the source reference (RSR) field may include a MAC address identifying a management entity of a session partner, and TPG identifier identifying a port device of the session partner.

The PDS field, the NPA field, and the SIQ field may perform the same functions and the PDS field, the NPA field, and the SIQ field included in the Session Initiation Request message.

The Per Op Code U_SNPM Body field of the Session Initiation Response message may include a session identifier (Session ID) field uniquely identifying a session initiated by the Source device, and a Downstream session size (DS Session Size) field indicating the downlink stream data size of the session, which is indicated by the NPA field, and an Upstream session size (US Session Size) field indicating the uplink stream data size of the session, which is indicated by the NPA field.

Additionally, the Per Op Code U_SNPM Body field may further include a Source identifier (Source ID) field indicating the identifier of a source device, which is selected by the control point (CP), a Source T-Group identifier (Source T-Group) field indicating the T-Group identifier of a source, when the corresponding session is coupled with another session, and a Source T-Adaptor mask field indicating the T-Adaptor mask of the T-Group of the source device.

Moreover, the Per Op Code U_SNPM Body field may further include a Sink identifier (Sink ID) field indicating the identifier of a sink device, which is selected by the control point (CP), a Sink T-Group identifier (Sink T-Group) field indicating the T-Group identifier of a sink, when the corresponding session is coupled with another session, and a Sink T-Adaptor Mask field indicating the T-Adaptor mask of the T-Group of the sink device.

In the Per Op Code U_SNPM Body field, the Source ID field, the Source T-Group field, and the Source T-Adaptor Mask field may be used for identifying the Adaptor of the source device, when a session is initiated. And, the Sink ID field, the Sink T-Group field, and the Sink T-Adaptor Mask field may be used for identifying the Adaptor of the sink device.

Furthermore, the Source ID field, the Source T-Group Field, and the Source T-Adaptor Mask field may be used as a current Partner T-Adaptor Reference field (i.e., TPTR (This Partner T-Adaptor Reference) field), which indicates the T-Adaptor of a current session partner. And, the Sink ID field, the Sink T-Group field, and the Sink T-Adaptor Mask field may be used as a partner T-Adaptor reference field (i.e., OPTR (Other Partner T-Adaptor Reference) field), which indicates the T-Adaptor of another session partner.

Referring back to FIG. 18, the BDP and the Living Room TV may report a Session Status Notify (or Notification) message, which includes Link Status Information on the HDBaseT Link, to the control point, either periodically or each time the state (or status) is changed. At this point, reference may be made to FIG. 15(a), and FIGS. 17(a) and (b) for the description of the functions and structure of the Session Status Notify message. In this case, the Session Status Notify message of FIG. 18 is also called as the Link Status Notify message of FIG. 17 (S1870, S1880).

The CP receiving the Session Status Notify message may be updated in the Session Routing Table of the CP itself based upon the session status information included in the Session Status Notify message.

Referring to FIG. 18, in another aspect of the disclosed embodiment of the present invention, a session may be configured by Interface to Interface. In this case, a Session Initiation Request message including the Group ID and the Port ID may be transmitted to the Session Initiation Request message of step S1810. More specifically, when the CP requests for an initiation of the session, by including the Group ID and the Port ID in the Session Initiation Request message, the user may designate a $1^{st}$ partner, the BDP, and a $2^{nd}$ partner, the T-Adaptor of the TV, with respect to the designated port, so as to request for an initiation of the session.

Referring to FIG. 18, in yet another aspect of the present invention, a case where the RPE is provided in the CP can be assumed. In this case, an optimal path from the source device, BDP, to the sink device, Living Room TV, may be calculated in advance from the RPE of the CP. In this case, in step S1810, the CP may transmit a Session Initiation Request message including information on the optimal route (or best route) path to the BDP. At this point, the process steps S1830 to S1840 of FIG. 18 may be omitted. Instead, the BDP may transmit a Link Status Request message requesting information on Link Status to the $1^{st}$ Switch, the $2^{nd}$ Switch, and the Living Room TV. And, the BDP may also receive a Link Status Response message including a Link Status table (ref. FIG. 15(c)) from the $1^{st}$ Switch, the $2^{nd}$ Switch, and the Living Room TV. In this case, the Bandwidth verification process of step S1835 may be performed by the BDP. If a bandwidth sufficient for providing contents to the corresponding session can be provided, the BDP may transmit a Session Initiation Response message including ACK information and non-zero Op code to the CP.

In FIG. 18, the Session Initiation Request message, the Session Initiation Response message, and the Session Status Notify messages may be transmitted through an HD-CMP message over the Ethernet, and the Session Route Request message and the Session Route Response message may be transmitted in an U_SNPM message format over the HDBaseT network. However, the Session Status Notify messages may also be transmitted over the HDBaseT network.

Figure 20:
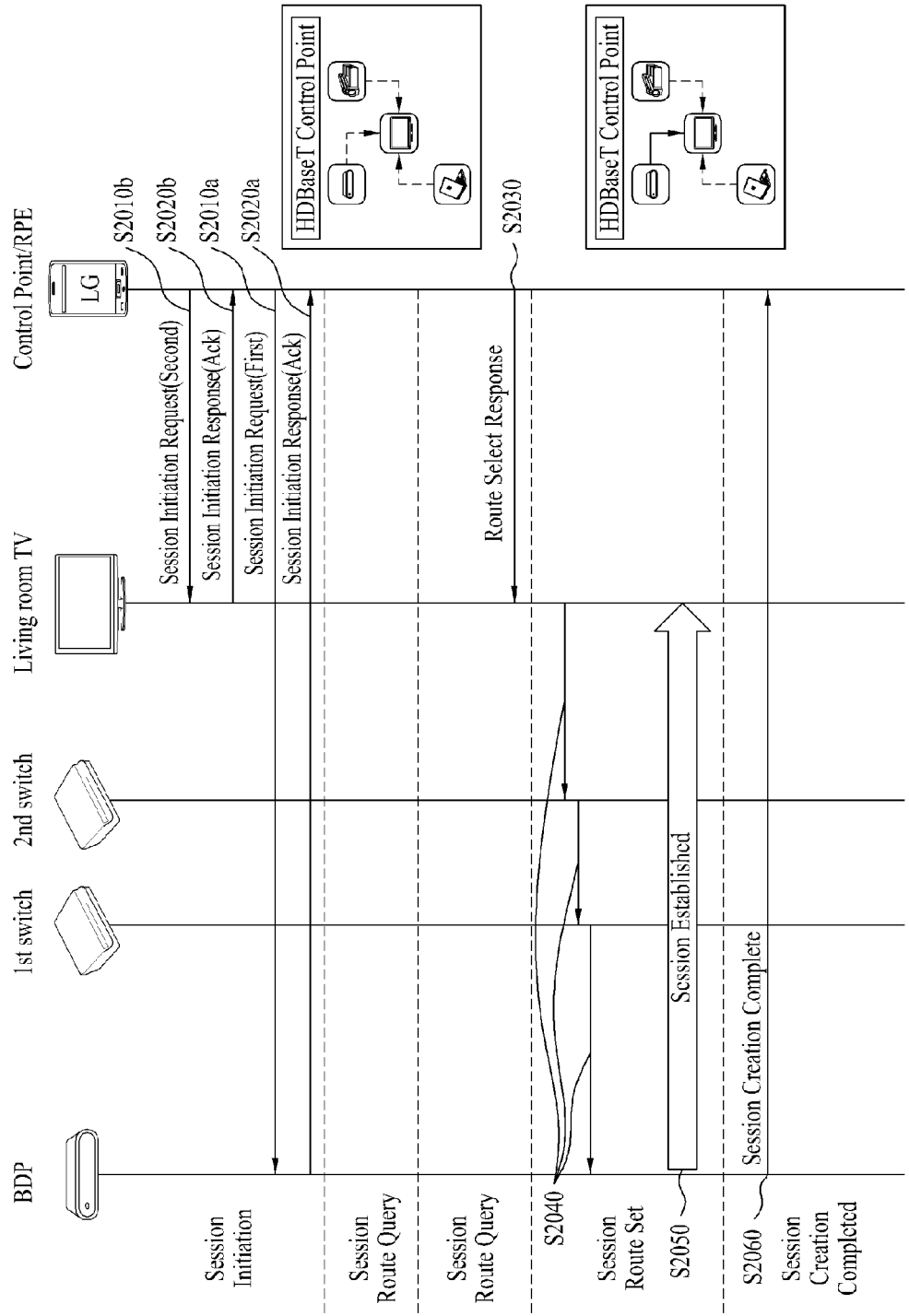
FIG. 20 illustrates another exemplary session routing method according to an embodiment of the present invention.

FIG. 20 illustrates another exemplary session routing method according to an embodiment of the present invention.

Just as shown in FIG. 18, a case where the CRS method is used is assumed in FIG. 20. When using the CRS method, it is preferable that the RPE computes and selects the path (i.e., route selection). Therefore, in the CRS method, the Session Route Request message and the Session Route Response message are not required.

In FIG. 20, since the CP has the function of the RPE, the CP may calculate for initiating a session and a valid session identifier (SID). The CP may select a Blu-ray Disc player (BDP) as the first partner entity and may select the Living Room TV as the second partner entity. Therefore, in order to verify the session initiation availability and the requirements for session initiation of the first partner entity and the second partner entity, the CP may sequentially transmit the Session Initiation Request message to the BDP and the Living Room TV (S2010a, S2010b).

In case the BDP and the Living Room TV are initiating a new session, the BDP and the Living Room TV may receive a Session Initiation Response message including a reception acknowledgment (ACK) message (S2020a, S2020b).

As described above, when using the CRS method, since the Best Route (or optimal route) may be calculated by the RPE of the CP, a Session Route Request (SRQ) is not required. Therefore, the CP may transmit information of the selected best route and a new session identifier (SID) to the second partner entity (TV) through a Session Route Select Response message (S2030).

The living room TV receiving the Session Route Select Response message may transmit a Session Route Set message, which includes information on the nest route and an initiated session identifier (SID) to the BDP through a second switch ($2^{nd}$ Switch) and a first switch ($1^{st}$ Switch) (S2040).

Having received the Session Select Response message in step S2030, the living room TV updates its own Session Routing table based upon the received Session Select Response message, and the 1$^{st}$ Switch, the 2$^{nd}$ Switch, and the BDP having received the Session Route Set message in step S2040 may update each Session Routing table based upon the received Session Route Set message.

The BDP may transmit contents to the TV through a newly set session (S2050).

In order to update the information on the new session, the BDP may broadcast a Session Creation Completed message to all CPs within the HDBaseT network. At this point, the Session Creation Completed message may include an identifier for the newly created session (SID), and resource information on the selected PDS and corresponding session (S2060).

According to the embodiments of the present invention, the Session Initiation Request message, the Session Initiation Response message, the Session Route Select Response message, and the Session Created Completed message may be transmitted through the HD-CMP message over the Ethernet, and the Session Route Request (SRQ) message and the Session Route Set (RSR) message may be transmitted in an U_SNPM message format within the HDBaseT Network. Furthermore, the structures of the Session Initiation Request message and the Session Response message are identical to the structures of the Session Initiation Request message and the Session Response message of FIG. 18. However, the set up status of each field may be varied.

Figure 21:
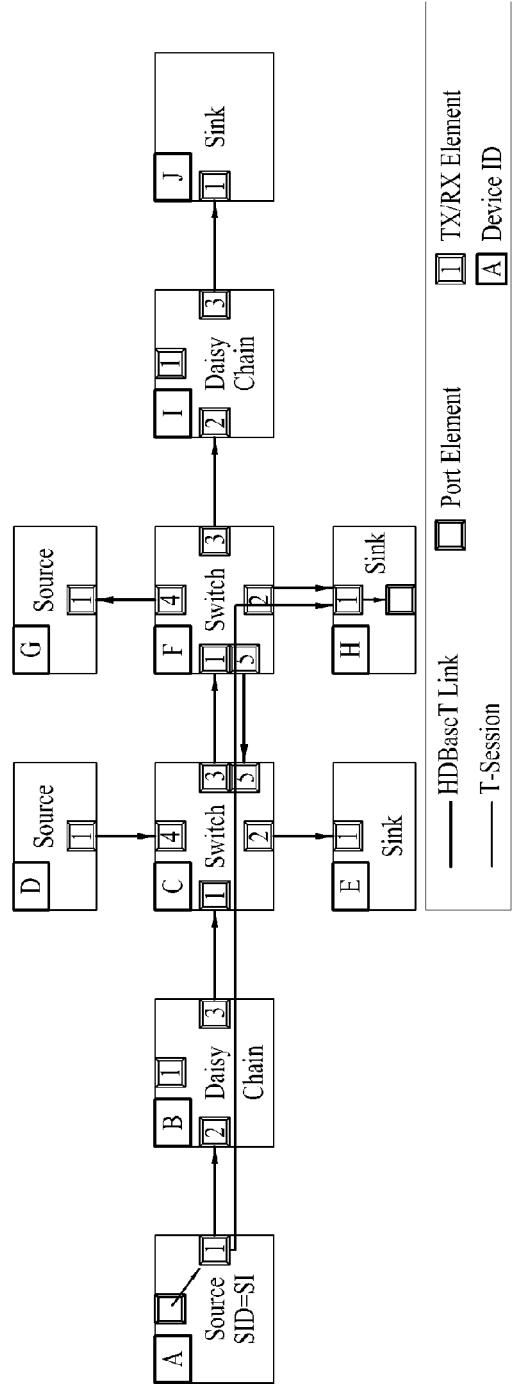
FIG. 21 illustrates an exemplary session status updating method according to an embodiment of the present invention.

FIG. 21 illustrates an exemplary session status updating method according to an embodiment of the present invention.

Referring to FIG. 21, Source Devices, Sink devices, and Switches are included in the HDBaseT Network. At this point, a Daisy Chain may be formed between the Switch and the source node or sink node. In case of a Daisy Chain connection, since one or more of the connected devices operate as a single device, the corresponding devices are illustrates as a single block. In FIG. 21, each HDBaseT device is identified by each alphabet (A, B, C, . . . , J), and the small box inside each device represents a port (and/or T-Adaptor) provided in each device.

Each of the HDBaseT entities creates and manages a Routing table and a Link Status table. Also, each of the HDBaseT entities may search for neighboring devices through an exchange of device status Request/response messages or through a periodic exchange of SNPM message. After verifying the neighboring devices and activated links, the HDBaseT entities may each create a Link Status Notify message and may transmit the created Link Status Notify message to a specific entity or to all entities within the network by using a broadcast method.

Each of the HDBaseT devices may update a Link Status table based upon the Link Status information included in the Link Status Notify message. Reference may be made to FIG. 15($b$) or FIG. 15($c$) for the description of the Link Status table.

FIG. 21 illustrates a case where an HDBaseT session (hereinafter referred to as T-Session) is created between source node A and sink node H. Reference may be made to FIG. 18 for the session creation procedure. In this case, source node A may transmit a Link Status Notify message, which includes link status information on the T-Session, to the devices within the HDBaseT Network. For example, source node A may transmit a Link Status Notify message including a transmission device identifier field (A), a TX port identifier field (1), a reception destination identifier field (B), a Reception port identifier (2), a total bandwidth field (8), a downstream bandwidth field (3), and upstream bandwidth field (1), and a session identifier field (S1) identifying an active session (Ref. FIG. 21($a$)).

When a Link Status Notify message is received from source node A, Daisy Chain B may acquire Link Status information included in the corresponding message. Therefore, Daisy Chain B may update the Link Status table as shown in FIG. 21($b$), and Daisy Chain B may transmit a Link Status Notify message including the Link Status information on the updated Link Status table.

Furthermore, Switch C may update its own Link Status table based upon the link status information included in the Link Status Notify message, which is transmitted from Daisy Chain B. Additionally, Switch C may also transmit a Link Status Notify message including Link Status information on its own Link Status table to Daisy Chain B, Sink Device E, and another Switch F, which are connected to Switch C (Ref. FIG. 21($c$)).

Having received the Link Status Notify message from Switch C, Sink Device E may update its own Link Status table, and Sink Device E may transmit a Link Status Notify message including the updated Link Status table back to Switch C. At this point, may further include Link Status information associated to Switch C itself in the Link Status Notify message, thereby transmitting the corresponding message.

FIG. 22 illustrates a method for managing a routing table and a link status table in a routing processor entity (RPE) supporting session routing according to an embodiment of the present invention.

The RPE calculates a best route from the source node to the sink node based upon the Link Status information and computes the Session Routing information. In order to compute (or calculate) a routing path from the RPE, a Link Status information and a Session Routing table are required. The Link Status table includes Link Status information on all links available for access from a specific HDBaseT device. Additionally, a Session Routing table is used for managing Session Routing information on a transmission port (Tx Port) of a specific HDBaseT device.

The RPE may transmit and receive a Session Connection Request message for managing a Link Status table and a Session Routing table.

The RPE may perform a path computation function. More specifically, the RPE may use the Dijkstra algorithm and the Link Status table so as to compute a best route respective to all devices. Also, the RPE may compute a transmission port identifier (Tx Port ID) for each destination based upon the path information from the source device to the sink device, and RPE may also update the computed transmission port identifier on the Session Routing table, which is managed by the RPE itself.

According to the embodiments of the present invention the RPE may be provided in any HDBaseT device. For example, the RPE may be provided in a source node, a sink node, a Daisy Chain, and/or a control point (CP).

In FIG. 22, it is assumed that the RPE is provided in a source node, BDP. Referring to FIG. 22, the control point may transmit a Session Request message to the BDP, wherein the Session Request message indicates that the source device is the BDP, that the source group is '1', that the source port identifier is '1' (i.e., HDMI data), that the sink device is the TV, that the sink group is '1', and that the sink port is '1' (i.e., HDMI data).

The RPE of the BDP, which has received the Session Request message, may calculate the best (or optimal) routing path by using the Dijkstar algorithm. At this point, the RPE may reflect the Link Status table so as to verify and update a minimum (or shortest) path from the Session Routing table, which is managed by the RPE itself. Furthermore, the RPE may verify a transmission port for an optimized path (or best path) for providing contents to the respective destination, the TV. And, the RPE may update the transmission port identifier on the Routing table.

The RPE transmits a Session Route Request message including Session Routing information to all devices between the source node (BDP) and the destination (TV).

As described above, the methods for configuring sessions in a home network system and setting up optimized paths of the configured sessions and apparatuses for supporting the same have the following advantages.

First of all, communication may be efficiently performed in the home network system.

Secondly, an optimal routing path may be calculated from a session configured in the HDBaseT Network.

Thirdly, the session status may be efficiently notified within the HDBaseT Network.

Fourthly, a session and a link may be efficiently maintained, updated, and managed within the HDBaseT Network.

Fifthly, the HDBaseT technology disclosed in the present invention may perform high definition video/audio transmission, transmission and reception of 3D images, data communication (Internet), power supply, and/or various control signal transmission by using a single cable. Therefore, only a single cable may be used without requiring the usage of multiple cables.

Finally, by supplying uncompressed HD multimedia contents and data, control signals, and power to multiple rooms at the same time through a single cable, user convenience may be largely enhanced.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for supporting a session routing in a High Definition Base transmission (HDBaseT) network, the method comprising:

receiving, by a HDbaseT device from a Routing Processor Entity (RPE) through the HDBaseT network, a Link Status Request message requesting Link status information;

configuring a Link Status Notify message for supporting the session routing, the Link Status Notify message including Link status information of the HDbaseT device; and transmitting the Link Status Notify message to the RPE through the HDbaseT network, wherein the Link status information of the Link Status Notify message is used to update a Link Status table, the Link Status table is used to compute routing path information from a source device to a sink device in the HDbaseT network, the HDbaseT device provides a simultaneous transmission of multiple streams, a transmission of uncompressed data, and a power transmission through a single link, and the multiple streams are transmitted uncompressed.

2. The method according to claim 1, wherein the Link Status Notify message includes a source reference (SRS) field identifying the HDbaseT device, a final target reference (FTR) field indicating a final destination of the Link Status Notify message, and a network path available field defining an available routing path of the HDbaseT network.

3. The method according to claim 1, wherein the Link Status Notify message further includes a downstream bandwidth field including information on a bandwidth of an available downlink stream and an upstream bandwidth field including information on a bandwidth of an available uplink stream.

4. The method according to claim 1, wherein the Link Status Request message includes a source reference (SRS) field identifying the RPE, a final target reference (FTR) field indicating a final destination of the Link Status Request message, and a path description section (PDS) field defining a routing path from the source device to the sink device.

5. The method according to claim 4, wherein the Link Status Request message further includes a Link Status Request Type field indicating a type of the Link Status Request, and a device identifier field.

6. The method according to claim 1, wherein the RPE is adapted on a switch, and
wherein the HDbaseT device corresponds to one of the source device, the sink device, another switch, and a control point.

7. A High Definition Base transmission (HDBaseT) device for supporting a session routing in an HDbaseT network, the HDBaseT device comprising:
a transmittier;
a processor; and
a receiver,
wherein the HDBaseT device is configured to:
receive, from a Routing Processor Entity (RPE) through the HDBaseT network by using the receiver, a Link Status Request message requesting Link status information;
configure a Link Status Notify message by using the processor for supporting the session routing, the Link Status Notify message including Link status information of the HDbaseT device; and
transmit the Link Status Notify message by using the transmitter to the RPE through the HDbaseT network, and
wherein the Link status information of the Link Status Notify message is used to update a Link Status table, the Link Status table is used to compute routing path information from a source device to a sink device in the HDbaseT network, the HDbaseT device provides a simultaneous transmission of multiple streams, a transmission of uncompressed data, and a power transmission through a single link, and the multiple streams are transmitted uncompressed.

8. The HDBaseT device according to claim 7, wherein the Link Status Notify message includes a source reference (SRS) field identifying the HDbaseT device, a final target reference (FTR) field indicating a final destination of the Link Status Notify message, and a network path available field defining an available routing path of the HDBaseT network.

9. The HDBaseT device according to claim 8, wherein the Link Status Notify message further includes a downstream bandwidth field including information on a bandwidth of an available downlink stream and an upstream bandwidth field including information on a bandwidth of an available uplink stream.

10. The HDBaseT device according to claim 7, wherein the Link Status Request message includes a source reference (SRS) field identifying the RPE, a final target reference (FTR) field indicating a final destination of the Link Status Request message, and a path description section (PDS) field defining a routing path from the source device to the sink device.

11. The HDBaseT device according to claim 10, wherein the Link Status Request message further includes a Link Status Request Type field indicating a type of the Link Status Request, and a device identifier field.

12. The HDBaseT device according to claim 7, wherein the RPE is adapted on a switch, and wherein the HDbaseT device corresponds to one of the source device, the sink device, another switch, and a control point.

\* \* \* \* \*